US010739202B2

(12) United States Patent
Shim et al.

(10) Patent No.: US 10,739,202 B2
(45) Date of Patent: Aug. 11, 2020

(54) SMART DEVICE AND METHOD FOR CONTROLLING SAME

(71) Applicant: LG ELECTRONICS INC., Seoul (KR)

(72) Inventors: Hongjo Shim, Seoul (KR); Hyunok Lee, Seoul (KR); Youngho Sohn, Seoul (KR); Seonghyok Kim, Seoul (KR); Mihyun Park, Seoul (KR); Jisoo Park, Seoul (KR); Hyunwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 15/772,519

(22) PCT Filed: Nov. 19, 2015

(86) PCT No.: PCT/KR2015/012485
§ 371 (c)(1),
(2) Date: Apr. 30, 2018

(87) PCT Pub. No.: WO2017/078208
PCT Pub. Date: May 11, 2017

(65) Prior Publication Data
US 2018/0313695 A1    Nov. 1, 2018

(30) Foreign Application Priority Data
Nov. 2, 2015    (KR) .......................... 10-2015-0153133

(51) Int. Cl.
*G01J 5/26*    (2006.01)
*G06K 9/20*    (2006.01)
(Continued)

(52) U.S. Cl.
CPC ............... *G01J 5/26* (2013.01); *G01J 5/0025* (2013.01); *G01J 5/025* (2013.01); *G01J 5/026* (2013.01);
(Continued)

(58) Field of Classification Search
CPC .......... G01J 5/26; G01J 5/0275; G01J 5/0265; G01J 5/026; G01J 5/089; G01J 5/0859;
(Continued)

(56) References Cited

U.S. PATENT DOCUMENTS

| 2011/0228811 A1* | 9/2011 | Fraden | G01J 5/061 374/130 |
| 2014/0159912 A1* | 6/2014 | Fraden | A61B 5/002 340/870.02 |

FOREIGN PATENT DOCUMENTS

| KR | 1020040061870 | 7/2004 |
| KR | 1020070057321 | 6/2007 |

(Continued)

OTHER PUBLICATIONS

PCT International Application No. PCT/KR2015/012485, Notification of Transmittal of the International Search Report and the Written Opinion of the International Searching Authority, or Declaration dated Jun. 24, 2016, 23 pages.

*Primary Examiner* — David P Porta
*Assistant Examiner* — Meenakshi S Sahu
(74) *Attorney, Agent, or Firm* — Lee, Hong, Degerman, Kang & Waimey

(57) ABSTRACT

The present application discloses a smart device comprising a temperature sensor, and a method for controlling the same. The present application relates to a smart device comprising a temperature sensor for measuring the temperature of a certain object at a position spaced a certain distance from the object and having a measurement range varying according to
(Continued)

the distance from the object. The present application provides a method for controlling a smart device comprising the steps of: measuring a distance from the smart device to the object for measuring the temperature of the object; if the measurement range of the temperature sensor at the measured position is not placed within the object, notifying a user that the temperature of the object cannot be measured; and directing the user to place the measurement range within the object.

20 Claims, 13 Drawing Sheets

(51) Int. Cl.
*H04M 1/725* (2006.01)
*G01J 5/02* (2006.01)
*G01J 5/08* (2006.01)
*G01J 5/00* (2006.01)
*G06K 9/00* (2006.01)
*H04M 1/02* (2006.01)

(52) U.S. Cl.
CPC ........... *G01J 5/0265* (2013.01); *G01J 5/0275* (2013.01); *G01J 5/089* (2013.01); *G01J 5/0859* (2013.01); *G06K 9/00362* (2013.01); *G06K 9/2018* (2013.01); *H04M 1/72522* (2013.01); *G06K 9/00087* (2013.01); *H04M 1/0202* (2013.01); *H04M 2250/12* (2013.01); *H04M 2250/22* (2013.01); *H04M 2250/52* (2013.01)

(58) Field of Classification Search
CPC .... G01J 5/025; G01J 5/0025; H04M 1/72522; H04M 2250/52; H04M 2250/22; H04M 2250/12; H04M 1/0202; G06K 9/2018; G06K 9/00362; G06K 9/00087
See application file for complete search history.

(56) References Cited

FOREIGN PATENT DOCUMENTS

| KR | 1020130142810 | 12/2013 |
| KR | 1020150072957 | 6/2015 |
| KR | 1020150100092 | 9/2015 |

* cited by examiner

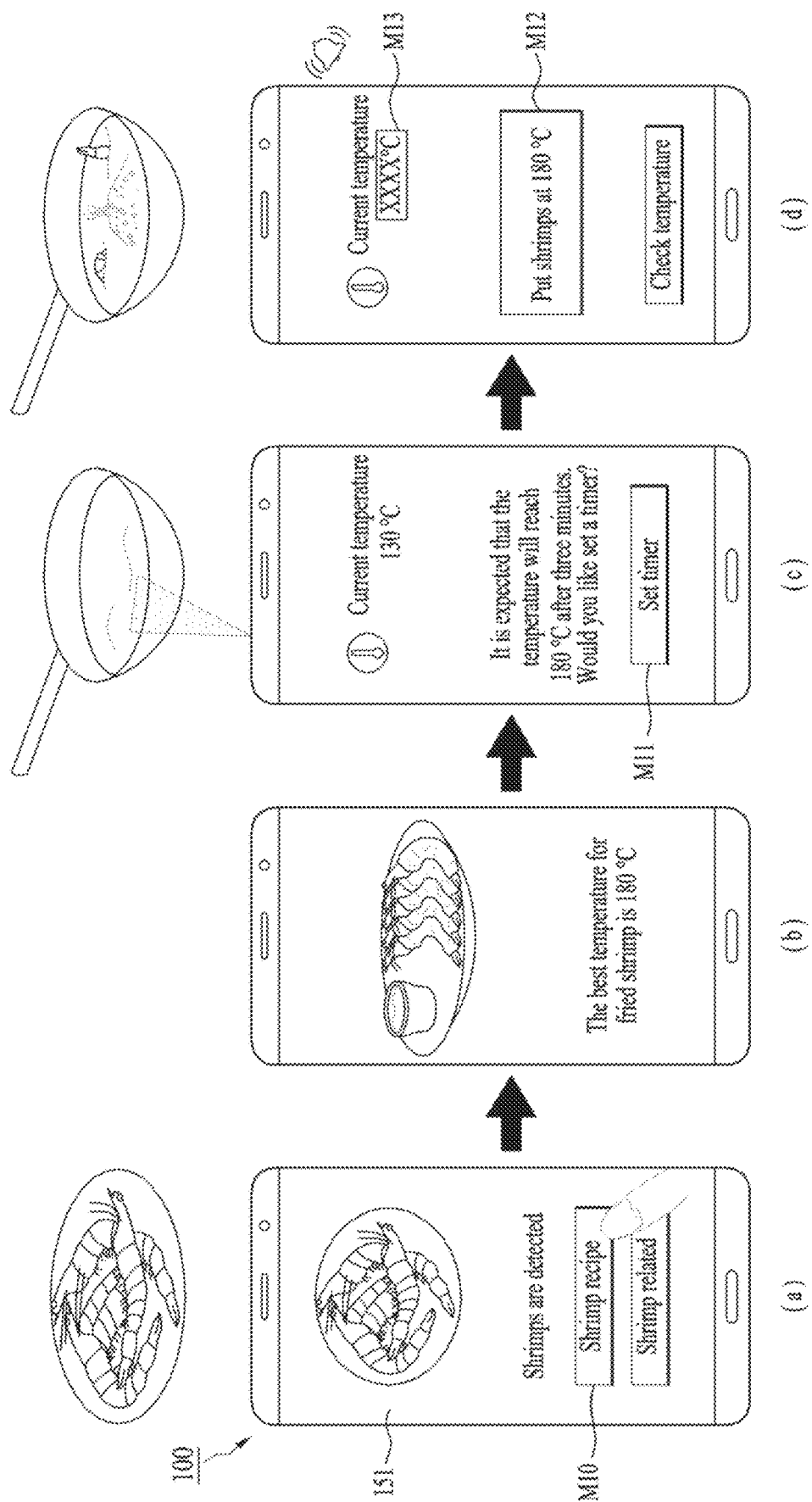

SMART DEVICE AND METHOD FOR CONTROLLING SAME

CROSS-REFERENCE TO RELATED APPLICATIONS

This application is the National Stage filing under 35 U.S.C. 371 of International Application No. PCT/KR2015/012485, filed on Nov. 19, 2015, which claims the benefit of earlier filing date and right of priority to Korean Application No. 10-2015-0153133, filed on Nov. 2, 2015, the contents of which are all hereby incorporated by reference herein in their entirety.

TECHNICAL FIELD

The present invention relates to a smart device and method for controlling the same, and more particularly, to a smart device with a temperature sensor and method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

The mobile terminals have become increasingly more functional. Examples of such functions include data and voice communication, image and video capturing through a camera, voice recording, music file playback through a speaker system, and image and video displaying through a display unit. Some mobile terminals include additional functions for supporting game playing and working as multimedia players. In particular, current mobile terminals can receive multicast signals including visual contents such as videos and television programs.

The mobile terminal is connected to the network or other devices through various communication protocols to perform the above-described functions, and thus a ubiquitous computing environment can be provided to users. That is, the mobile terminal has been evolved as a smart device capable of providing connectivity to the network and ubiquitous computing. Traditionally, the smart device capable of operating as the mobile terminal has been designed at a size suitable for a user to grab the smart device with the user's hand. As a result, the user could carry around the smart device in the hand or put the smart device in a bag or pocket. In accordance with the recent development of technology, the size of the smart device has been remarkably reduced, and moreover, the smart device has been developed as a wearable smart device, which can be directly worn on the user's body.

Meanwhile, with the increasing interest in health, it has been recently considered that a health management function is added to the smart device. Specifically, since the smart device has the aforementioned advantages, the smart device can not only measure a variety of body information but also check and manage the user state based on the measured information. In particular, since the human body temperature is the foundation of human body information, many researches are made to enable the smart device to measure the body temperature. In addition, if the smart device is configured to measure the body temperature, it can measure the temperature of another object as well and thus provide various additional functions to the user based on the measured temperatures. Accordingly, the smart device and controlling method therefor need to be improved to measure temperatures of various objects including the human body temperature accurately and efficiently.

DISCLOSURE OF THE INVENTION

Technical Task

Accordingly, an object of the present invention is to solve not only the above-described problems but also other problems. In addition, another object of the present invention is to provide a smart device for measuring the temperature of an object accurately and efficiently and method for controlling the same.

Technical Solutions

To achieve these objects and other advantages, in an aspect of the present invention, provided herein is a method for controlling a smart device, wherein the smart device measures temperature of a predetermined object at a position away from the object and includes a temperature sensor with a measurement range varying according to distance to the object, the method including: measuring the distance from the smart device to the object to measure the temperature of the object; if the measurement range of the temperature sensor is not placed within the object at the measured distance, notifying a user that the temperature of the object cannot be measured; and guiding the user to place the measurement range within the object.

The measurement range of the temperature sensor may correspond to an area in which temperature can be measured by the temperature sensor.

The control method may further include: before measuring the distance, obtaining an image of the object through the smart device; and recognizing the object from the image obtained through the smart device. In this case, the recognizing may include: either automatically recognizing an object located at the center of the obtained image or the largest object; or recognizing an object designated by the user. In addition, the recognizing may include automatically recognizing a human body from the obtained image. Moreover, the measuring may include measuring the distance between the recognized object and the smart device.

The control method may further include displaying the measurement range of the temperature sensor at the measured distance before notifying that the temperature of the object cannot be measured. In addition, the control method may further include detecting whether the measurement range of the temperature sensor is placed within the object at the measured distance before notifying that the temperature of the object cannot be measured. In this case, the detecting may include: calculating a size of the object and the measurement range of the temperature sensor at the distance from the image obtained through the smart device; and comparing the calculated size of the object and the calculated measurement range of the temperature sensor. In detail, the detecting may include: if the size of the object is larger than the measurement range of the temperature sensor, determining that the measurement range of the temperature sensor is placed within the object; and if the size of the object is smaller than the measurement range of the temperature sensor, determining that the measurement range of the temperature sensor is not placed within the object.

The guiding may include informing the user to reduce the distance between the smart device and the object.

The control method may further include: if the measurement range of the temperature sensor is included within the object at the measured distance, measuring the temperature of the object using the temperature sensor; and notifying the user of the measured temperature.

The temperature sensor and a camera of the smart device may be configured such that an angle of measurement of the temperature sensor and an angle of view of the camera overlap with each other. Preferably, the angle of view of the camera may be 80°, and the angle of measurement may be 45°. In addition, the temperature sensor may be located in a radius of 8 mm around the camera.

In another aspect of the present invention, provided herein is a method for controlling a smart device, wherein the smart device includes a temperature sensor configured to measure temperature of a predetermined object when contacting with the object, the method including: detecting that there is an incoming call to the smart device; if the incoming call is received, detecting whether a body of a user is contacted with the temperature sensor; and if the user's body is contacted with the temperature sensor, measuring body temperature of the user.

The temperature sensor may be installed in the smart device and disposed adjacent to a receiver configured to transfer voice to the user.

The control method may further include, if the user's body is not contacted with the temperature sensor, notifying the user that the temperature of the object cannot be measured. In addition, the control method may further include, if the user's body is not contacted with the temperature sensor, guiding the user to contact the user's body with the temperature sensor.

The control method may further include, before detecting the incoming call, configuring to automatically measure the body temperature of the user during a call. In addition, the control method may further include, if the user does not contact with the temperature sensor during a predetermined time, terminating the measurement of the user's body temperature.

Advantageous Effects

According to the present invention, the temperature sensor is configured to have an optimal position and angle of measurement (measurement angle) by considering the position and angle of view of the camera, and thus it is possible to achieve accurate and efficient temperature measurement. In addition, since the method for controlling the smart device is optimally configured in consideration of characteristics of an object as well as those of the temperature sensor, the smart device can perform the temperature measurement more accurately and efficiently.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 18 is a plan view illustrating an example of the control method illustrated in FIG. 17.

BEST MODE FOR INVENTION

Figure 1:
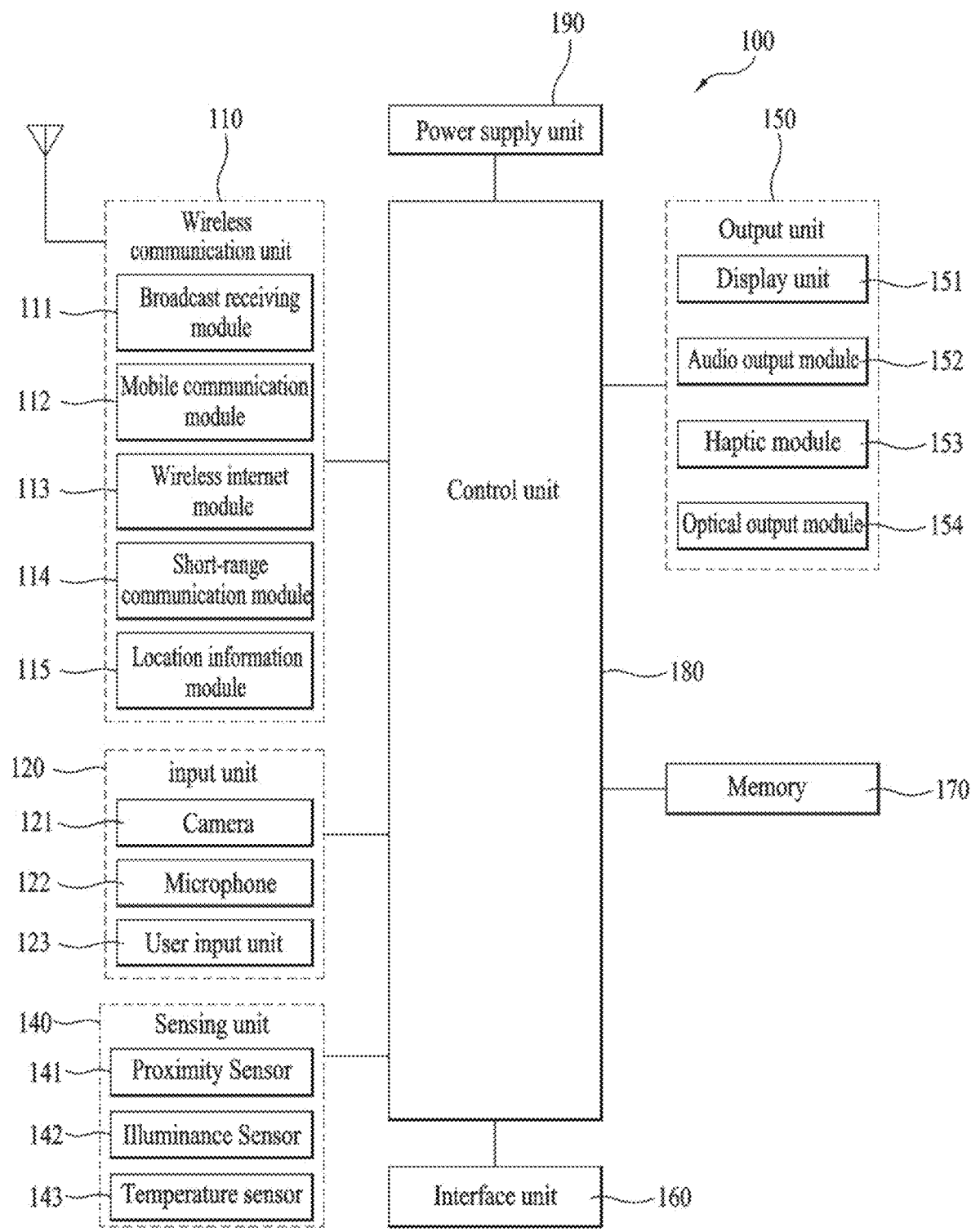
FIG. 1 is a block diagram illustrating the configuration of the smart device according to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such a term herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first (1st), second (2nd), etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present application includes a combination of features, numerals, steps, operations, components, parts and the like partially omitted from the related or involved features, numerals, steps, operations, components and parts described using the aforementioned terms unless deviating from the intentions of the disclosed original invention.

Smart devices presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like. By way of non-limiting example only, further description will be made with reference to particular types of smart devices. However, such teachings apply equally to other types of smart devices, such as those types noted above.

FIG. 1 is a block diagram to describe a smart device related to the present application. A general configuration of the smart device is described with reference to FIG. 1 as follows.

First of all, the smart device 100 may include components such as a wireless communication unit 110, an input unit 120, a sensing unit 140, an output unit 150, an interface unit 160, a memory 170, a controller 180, a power supply unit 190, and the like. It is appreciated that implementing all of the components shown in FIG. 1 is not a requirement, and that greater or fewer components may alternatively be implemented. Moreover, the real shapes and structures of the aforementioned components are not illustrated all but the shapes and structures of some significant components are shown in the drawings following FIG. 1. Yet, it is apparent to those skilled in the art that components described without being illustrated can be included in the smart watch to embody the functions of a smart device.

In particular, among the above-listed components, the wireless communication unit 110 typically includes one or more modules which permit communications such as wireless communications between the smart device 100 and a wireless communication system, communications between the smart device 100 and another smart device, communications between the smart device 100 and an external server. Further, the wireless communication unit 110 typically includes one or more modules which connect the smart device 100 to one or more networks.

To facilitate such communications, the wireless communication unit 110 may include one or more of a broadcast receiving module 111, a mobile communication module 112, a wireless Internet module 113, a short-range communication module 114, and a location information module 115.

The input unit 120 includes a camera 121 (or an image input unit) for an image or video signal input, a microphone 122 (or an audio input unit) for an audio signal input, and a user input unit 123 (e.g., a touch key, a push key (a mechanical key), etc.) for receiving an input of information from a user. Audio or image data collected by the input unit 120 may be analyzed and processed into user's control command.

The sensing unit 140 is typically implemented using one or more sensors configured to sense internal information of the smart device, the surrounding environment of the smart device, user information, and the like. For example, the sensing unit 140 may include at least one of a proximity sensor 141, an illumination sensor 142, touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, the camera 12a), the microphone 12b, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. As the environment sensor, the sensing unit 140 may include a temperature sensor 143 configured to measure a temperature of an object including a human body. The smart device 100 disclosed in the present specification may be configured to utilize information obtained from the sensing unit 140, and in particular, information obtained from one or more sensors of the sensing unit 140, and combinations thereof.

The output unit 150 is typically configured to output various types of information, such as audio, video, tactile output, and the like. The output unit 150 may include a display unit 151, an audio output unit 152, a haptic module 153, and an optical output module 154. The display unit 151 may have an inter-layered structure or an integrated structure with a touch sensor in order to facilitate a touchscreen. The touchscreen may provide an output interface between the smart device 100 and a user, as well as function as the user input unit 123 which provides an input interface between the smart device 100 and the user.

The interface unit 160 serves as an interface with various types of external devices that can be coupled to the smart device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the smart watch 100 may perform assorted control functions associated with a connected external device, in response to the external device being connected to the interface unit 160.

The memory 170 is typically implemented to store data to support various functions or features of the smart device 100. For instance, the memory 170 may be configured to store application programs (or applications) run in the smart watch 100, data or instructions for operations of the smart device 100, and the like. Some of these application programs may be downloaded from an external server via wireless communication. Other application programs may be installed on the smart device 100 at time of manufacturing or shipping, which is typically the case for basic functions of the smart device 100 (for example, receiving a call, placing a call, receiving a message, sending a message, and the like). It is common for application programs to be stored in the memory 170, installed on the smart device 100, and launched by the controller 180 to perform operations (or functions) for the smart device 100.

The controller 180 typically functions to control overall operations of the smart device 100, in addition to the operations associated with the application programs. The controller 180 may provide or process information or functions appropriate for a user by processing signals, data, information and the like, which are inputted or outputted by the various components depicted in the above description, or running application programs stored in the memory 170.

Moreover, in order to launch an application program stored in the memory 170, the controller 180 can control at least one portion of the components described with reference to FIG. 1. Furthermore, the controller 180 controls at least two of the components included in the smart device 100 to be activated in combination to launch the application program.

The power supply unit 190 can be configured to receive external power or provide internal power in order to supply appropriate power required for operating elements and components included in the smart device 100. The power supply unit 190 may include a battery. In particular, the battery may include at least one of a built-in battery or a replaceable (or detachable) battery.

At least some of the components can cooperatively operate to implement the operations, controls or controlling methods of the smart device according to various embodiments, which will be described later. In addition, the operations, controls or controlling methods of the smart device may be implemented on the smart device through driving of at least one application program stored in the memory 170.

In the accompanying drawings, it is illustrated that the smart device 100 has a body in the shape of a bar. However, the smart device 100 according to the present invention is not limited thereto, and it may have various structures and shapes. For example, the smart device 100 may have a wearable body such as a watch, a bracelet, a necklace and glasses. That is, the configuration of a specific type of smart device and description thereof can be generally applied to other types of smart devices as well as the specific type of smart device.

Figure 2:
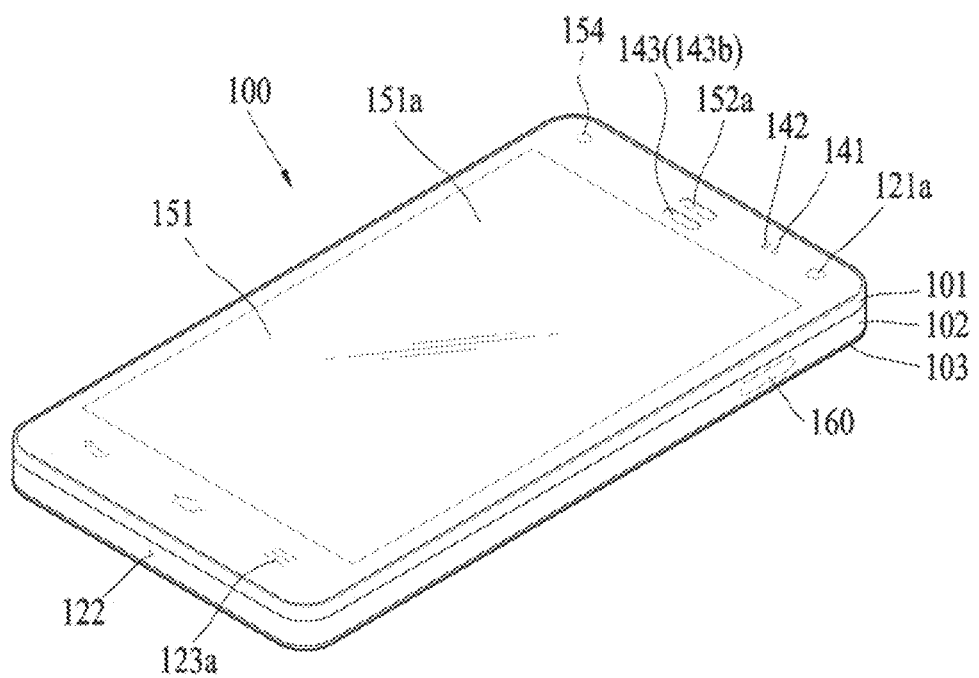
FIGS. 2 and 3 are perspective views of an exemplary smart device, viewed from different directions.
Figure 3:
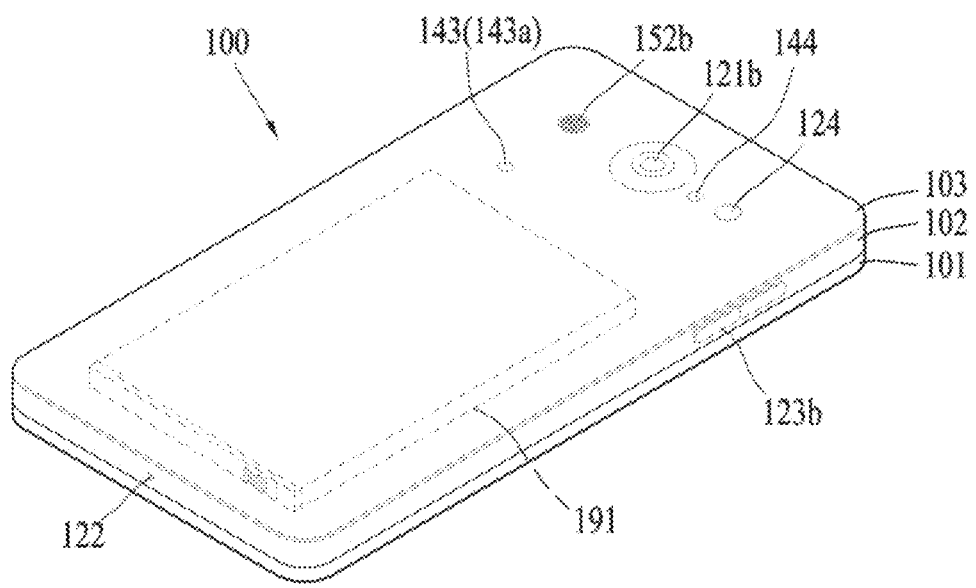

In addition to the above-described general configuration of the smart device 100, the structure of the smart device 100 will be described with reference to the related drawings. That is, FIGS. 2 and 3 are perspective views of an exemplary smart device, viewed from different directions. Specifically, FIG. 2 is a front view of the smart device 100, and FIG. 3 is a rear view of the smart device 100. Since the overall structure of the smart device 100 is illustrated in FIGS. 2 and 3, it is assumed that all descriptions are basically made with reference to FIGS. 2 and 3 unless a diagram to be used as a reference is specified.

The smart device 100 has a body in the shape of a bar as described above. The shape of the body can be modified in various ways if necessary. Here, considering the smart device 100 as at least one assembly, the body may be understood as indicating the smart device. Therefore, it can be interpreted to mean that all the components, which will be described later, may be provided, installed, or included in the body of the smart device 100.

The smart device 100 includes a case (e.g. frame, housing, cover, etc.) forming the external appearance of the device. As shown in the drawing, the smart device 100 may include a front case 101 and a rear case 102. Various electronic components are incorporated into a space formed between the front case 101 and the rear case 102. The combined cases 101 and 102 may form the external appearance of the smart device 100 or body. At least one middle case may be additionally positioned between the front case 101 and the rear case 102.

The display unit 151 may be disposed on the front side of the body of the smart device 100 to display information. As illustrated in the drawing, the display unit 151 may be exposed from the front case 101 to form the front side of the smart device 100 together with the front case 101.

In some cases, electronic components may also be mounted to the rear case 102. Examples of such electronic components include a detachable battery, an identification module, a memory card, and the like. A rear cover 103 for covering the electronics components may be detachably coupled to the rear case 102. Therefore, when the rear cover 103 is detached from the rear case 102, the electronic components mounted to the rear case 102 are exposed to the outside.

As shown in the drawing, when the rear cover 103 is coupled to the rear case 102, a side surface of the rear case 102 may be partially exposed. In some cases, when the rear cover 103 is coupled to the rear case 102, the rear case 102 may be completely shielded by the rear cover 103. In some embodiments, the rear cover 103 may include an opening for externally exposing a camera 121b or an audio output unit 152b.

The cases 101, 102, 103 may be formed by injection-molding synthetic resin or may be made with a metal, for example, stainless steel (STS), aluminum (Al), titanium (Ti), or the like.

Unlike the example in which a plurality of cases form an inner space for accommodating components, the smart device 100 may be configured such that the inner space is provided by a single case. In this case, the smart device 100 can be implemented to have a uni-body by extending synthetic resin or metal from the side surface to the rear surface.

If desired, the smart device 100 may include a waterproofing unit (not shown) for preventing introduction of water into the body thereof. For example, the waterproofing unit may include a waterproofing member which is located between a window 151a and the front case 101, between the front case 101 and the rear case 102, or between the rear case 102 and the rear cover 103, to hermetically seal an inner space when those cases are coupled.

The smart device 100 may include the display unit 151, a first audio output unit 152a, the second audio output unit 152b, the proximity sensor 141, the illumination sensor 142, the optical output unit 154, a first camera 121a, the second camera 121b, first and second manipulation units 123a and 123b, the microphone 122, the interface unit 160, and the like.

Hereinafter, as illustrated in FIGS. 2 and 3, a description will be given of the exemplary smart device 100 in which the display unit 151, the first audio output unit 152a, the proximity sensor 141, the illumination sensor 142, the optical output unit 154, the first camera 121a, and the first manipulation unit 123a are disposed on the front side of the body of the smart device 100, the second manipulation unit 123b, the microphone 122, and the interface unit 160 are disposed on the side of the body, and the second audio output unit 152b and the second camera 121b are supposed on the rear side of the body.

However, the disposition of the components is not limited thereto. Some components may be omitted, replaced, or located on different sides. For example, the first manipulation unit 123a may not be disposed on the front side of the body of the smart device 100, and the second audio output unit 152b may be disposed on the side of the body other than the rear side of the body.

The display unit 151 displays (outputs) information processed by the smart device 100. For example, the display unit 151 may display execution screen information of an application program launched by the smart device 100 or user interface (UI) and graphic user interface (GUI) information in accordance with the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 151 may include a display module (not shown in the drawing) and the window 151a for covering the display module. The display module can be implemented using the above-described display devices, for example, the LCD, OLED, etc., and it corresponds to the component in charge of displaying image information. The window 151a may be disposed on a portion of the display module, which is exposed to a user, and configured to protect the display module from the outside. In addition to this protection function, the window 151a allows the user to see information displayed on the display module. Thus, the window 151a may be made with a material having proper strength and transparency. In addition, the display module may be directly attached to the rear side of the window 151a. Particularly, various ways can be used to directly attach the display module to the window 151, and as the most convenient way, adhesive may be used for the direct attachment.

The smart device 100 may include two or more display units according to the design of the smart device 100. In this case, a plurality of the display units may be disposed on one side, either spaced apart from each other or integrated, or the display units may be disposed on different sides.

To receive a control command using the touch input system, the display unit 151 may also include a touch sensor (not shown in the drawing) for sensing a touch received at the display unit 151. The touch sensor may use one or more systems among various touch systems such as a resistive system, a capacitive system, an infrared system, a magnetic field system, etc. As one example, as in the resistive and capacitive systems, the touch sensor may be configured to convert change of the pressure applied to a specific point of a touch screen or change of the capacitance occurring at a certain point thereof into an electric input signal. In this case, the touch screen, which corresponds to a touch input device for the smart device, may be configured with the display unit 151 and touch sensor. The display unit 151 can operate as the touch screen corresponding to a user interface and at the same time, display prescribed image information. That is, the display unit 151 may work as not only the output unit 150 but also the input unit 120. When a touch is received at the display unit 151, the touch sensor may sense the touch, and the control unit 180 may generate a control command corresponding to the touch. The contents inputted through the touch system may include letters, numbers, or menus represented or can be represented in each mode.

The touch sensor may be implemented in the form of a film having a touch pattern, disposed between the window 151a and the display module disposed on the rear side of the window 151a. Alternatively, it may be made with a metal wire which is patterned directly on the rear side of the window 151a. Further, it may be integrally formed with the display module. For example, the touch sensor may be disposed on a substrate of the display module or provided within the display module.

As described above, the touch screen may be implemented using the display unit 151 and touch sensor. In this case, the touch screen may operate as the user input unit 123 (cf. FIG. 1). If necessary, as the user input unit 123, a physical key (e.g., push key) may be additionally provided adjacent to the display unit 151 operating as the touch screen for user convenience.

The first audio output unit 152a may be configured as a receiver for transferring voice to the user's ear, and the second audio output unit 152b may be configured as a loud speaker for outputting various alarm sounds and multimedia play sounds.

The window 151a of the display unit 151 may include a sound opening for outputting sounds generated by the first audio output unit 152a. However, the present invention is not limited thereto, and the sounds may be released along an assembly gap between the structural bodies (for example, a gap between the window 151a and the front case 101). In this case, the opening, which is independently formed to output sounds, may not be seen or be hidden for good appearance, thereby further simplifying the appearance of the smart device 100.

The optical output unit 154 is configured to output light for indicating generation of an event. Examples of such events include message reception, call signal reception, missed call, alarm, schedule notification, email reception, information reception through an application, and the like. After a user checks such an event, the control unit 180 can control the optical output unit 154 to stop outputting the light.

The first camera 121a is configured to process image frames of still or moving images obtained by the image sensor operating in a capture mode or video call mode. The processed image frames can be displayed on the display unit 151 or stored in the memory 170.

Each of the first and second manipulation units 123a and 123b may be considered as an example of the user input unit 123, which may be manipulated by a user to provide an input to the smart device 100. The first and second manipulation units 123a and 123b may be commonly referred to as a manipulating portion and employ any tactile methods that allow the user to perform manipulation such as touch, push, scroll, or the like. The first and second manipulation units 123a and 123b may also employ any non-tactile methods that allows the user to perform manipulation such as proximity touch, hovering, or the like.

Although it is illustrated in the drawing that the first manipulation unit 123a is implemented as a touch key, the present invention is not limited thereto. For example, the first manipulation unit 123a may be implemented as a push (mechanical) key or a combination of the touch and push keys.

Various inputs may be received at the first and second manipulation units 123a and 123b. For example, the first manipulation unit 123a may be used to receive commands associated with the menu, home key, cancel, search, etc., and the second manipulation unit 123b may be used to receive commands associated with adjustment of volumes outputted by the first or second audio output units 152a or 152b, switching the current mode of the display unit 151 to a touch recognition mode.

Each of the manipulation units 123a and 123b may be implemented as a touch input device having the similar structure to the touch screen applied to the display unit 151.

However, unlike the touch screen, each of the manipulation units 123a and 123b may be simply configured to receive a command without displaying image information, and in this case, the touch input device applied to such a manipulation unit can be referred to as a touch pad.

Meanwhile, as another example of the user input unit 123, a rear input unit (not shown in the drawing) may be disposed on the rear side of the body of the smart device 100. The rear input unit can be manipulated to receive commands for controlling operation of the smart device 100, and it can receive various inputs. For example, the rear input unit may receive not only the commands associated with power on/off, start, end, and scroll but also the commands associated with adjustment of volumes outputted by the first or second audio output units 152a or 152b and switching the current mode of the display unit 151 to the touch recognition mode. The rear input unit may be configured to receive a touch input, a push input, or combinations thereof.

The rear input unit may be disposed such that it overlaps with the display unit 151 located at the front side in a thickness direction of the body of the device 100. For example, the rear input unit may be located on the top of the rear side of the body of the device 100 so that the user can easily manipulate it using the forefinger while grabbing grabs the body with one hand. However, the present invention is not limited thereto, and the location of the rear input unit may be changed.

When the rear input unit is disposed on the rear side of the body of the device 100, a new type of user interface can be implemented using the rear input unit. When the aforementioned touch screen or rear input unit is disposed on the front side of the body of the device 100, it can replace some or all of the functionality of the first manipulation unit 123a. On the other hand, when the first input unit 123a is not disposed on the front side of the body, the display unit 151 may be configured to have a larger screen.

Meanwhile, the smart device 100 may include a finger recognition sensor for scanning a user's fingerprint. The control unit 180 can use fingerprint information sensed by the finger recognition sensor as an authentication means. The finger recognition sensor may be installed in the display unit 151 or the user input unit 123.

The microphone 122 is configured to receive user's voices and other extra sounds. If necessary, multiple microphones may be implemented to receive stereo sounds.

The interface unit 160 may serve as a path for connecting the smart device 100 to external devices. For example, the interface unit 160 may include at least one of a connection terminal for connecting to another device (e.g., an earphone, an external speaker, etc.), a port for near field communication (e.g., an infrared data association (IrDA) port, a Bluetooth port, a wireless LAN port, etc.), and a power supply terminal for supplying power to the smart device 100. The interface unit 160 may be implemented in the form of a socket for accommodating an external card, such as a subscriber identification module (SIM), a user identity module (UIM), or a memory card for information storage.

The second camera 121b may be disposed on the rear side of the body of the smart device 100, and in this case, the second camera 121b has an image capturing direction substantially opposite to that of the first camera unit 121a.

The second camera 121b may include a plurality of lenses arranged along at least one line. The plurality of lenses may be also arranged in a matrix configuration. This camera may be called an array camera. When the second camera 121b is implemented as the array camera, images may be captured in various manners using a plurality of lenses and images with better qualities can be obtained. Similarly, the first camera 121a may be implemented as the array camera.

A flash 124 may be disposed adjacent to the second camera 121b. When an image of a subject is captured by the second camera 121b, the flash 124 may apply light toward the subject. In addition, the smart device 100 may include a distance sensor 144 disposed adjacent to the second camera 121b. Similar to the proximity sensor 141 disposed on the front side of the smart device 100, the distance sensor 144 can measure a distance from the smart device 100 to a certain object. The measured distance can be used not only by the second camera 121b in obtaining an image suitable for the object but also for various other purposes.

The second audio output unit 152b can be additionally provided in the body of the smart device 100. The second audio output unit 152b may implement stereophonic sound functions in conjunction with the first audio output unit 152a and be also used for implementing a speaker phone mode for call connection.

At least one antenna for wireless communication may be provided in the body of the smart device 100. The antenna may be installed in the body or formed in the case. For example, an antenna which configures a part of the broadcast receiving module 111 (cf. FIG. 1) may be retractable into/from the body. Alternatively, an antenna may be implemented in the form of a film attached to the inside of the rear cover 103, or a case containing a conductive material may be configured to serve as an antenna.

The power supply unit 190 (cf. FIG. 1) for supplying power to the smart device 100 may be provided in the body of the smart device 100. In addition, the power supply unit 190 may include a battery 191 configured to be detachable from the body.

The battery 191 may be configured to receive power over a power source cable connected to the interface unit 160. In addition, the battery 191 can be wirelessly recharged through a wireless charger. The wireless charging may be implemented by magnetic induction or resonance (e.g., electromagnetic resonance).

In the present drawing, the rear cover 103 is coupled to the rear case 102, covering the battery 191. This coupling may prevent separation of the battery 191 and protect the battery 191 from an external impact or foreign particles. If the battery 191 is configured to be detachable from the body, the rear case 103 can be detachably coupled to the rear case 102.

Although not shown in FIGS. 2 and 3, a board may be installed in the cases 101 and 102, and it is a component disposed together with various electronic devices, in particular, various processors included in the control unit 180, other circuits and devices for assisting the processors, and the like. To allow the control unit 180 to control the individual components 110 to 190 illustrated in FIG. 1, these components may be directly disposed on the board. Alternatively, the components may be included in the cases 101 and 102 or in the inside thereof and then electrically connected to the board. For example, although the window 151a (i.e., touch sensor) and display module are exposed to the outside, they can be connected to the board through wires. The control unit 180 can be called various names such as a controller, a controlling device and the like and control all the components of the smart device 100. Such controllable components include components explained in the following description as well as the components shown in FIG. 1. This is why the control unit 180 can become a substantial component for appropriately performing the controlling method according to the present invention by controlling operations of other components. For these reasons, all the steps performed according to the controlling method can be considered as features of the control unit 180.

Meanwhile, an accessory for protecting the appearance of the smart device 100 or assisting or extending the functions of the smart device 100 can also be added. For example, the accessory may include a cover or pouch for covering or accommodating at least one side of the smart device 100. The cover or pouch may be configured to extend functionality of the smart terminal 100 through interworking with the display unit 151. For another example, the accessory may include a touch pen for assisting or extending the touch system of the touch screen.

Meanwhile, as described above, the smart device 100 has capability of executing various functions in spite of the small size. Specifically, the smart device 100 can measure various information on the surrounding environment and provide additional functions to the user based on the measured information. In detail, with the increasing interest in health, the smart device 100 is designed to be able to not only measure various human body information but also check and manage the human health state based on the measured information. In particular, considering that the human body temperature is the foundation of human body information, the measurement of the human body temperature is essential for health care. For these reasons, the smart device 100 may include a temperature sensor 143 (143a and 143b) configured to measure the temperature of an object including the human body temperature. In addition, since the temperature sensor 143 can measure the temperature of another object including the human body temperature, the smart device 100 can additionally provide various functions necessary for the health care to the user based on the measured temperatures.

Figure 4:
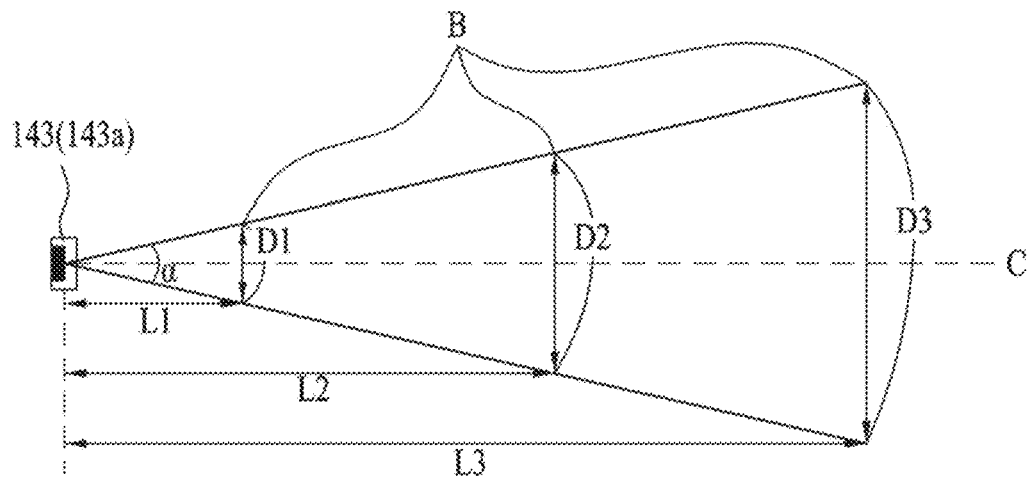
FIG. 4 is a schematic view illustrating a measurement range and angle of measurement of the temperature sensor depending on distance.
Figure 5:
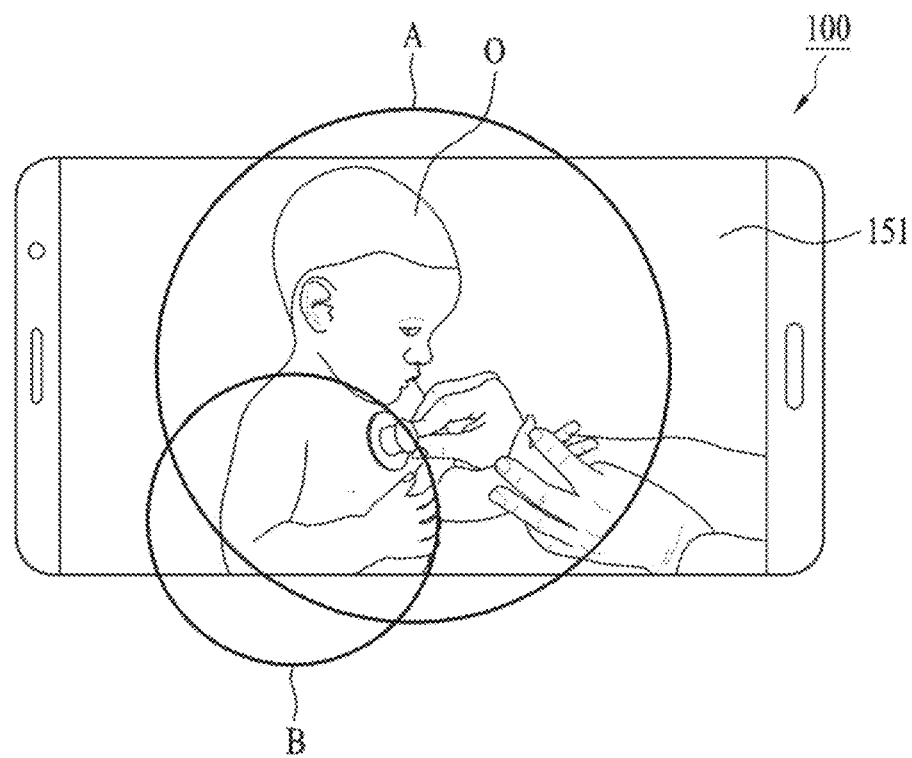
FIG. 5 is a plan view illustrating a photograph range in accordance with the camera's angle of view and a measurement range in accordance with the temperature sensor's angle of measurement.
Figure 6:
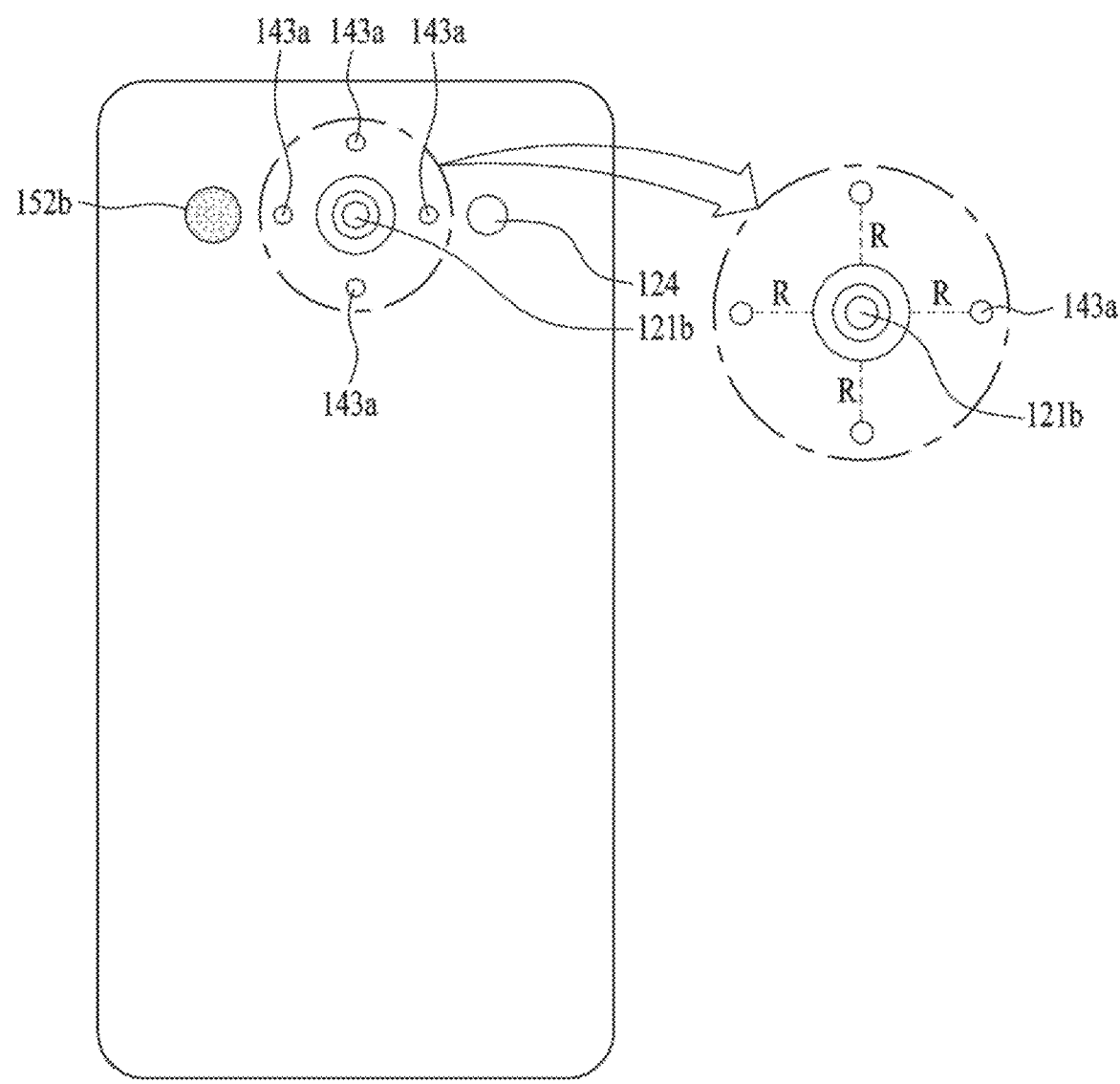
FIG. 6 is a rear view illustrating the camera and temperature sensor optimally disposed on the smart device.
Figure 7:
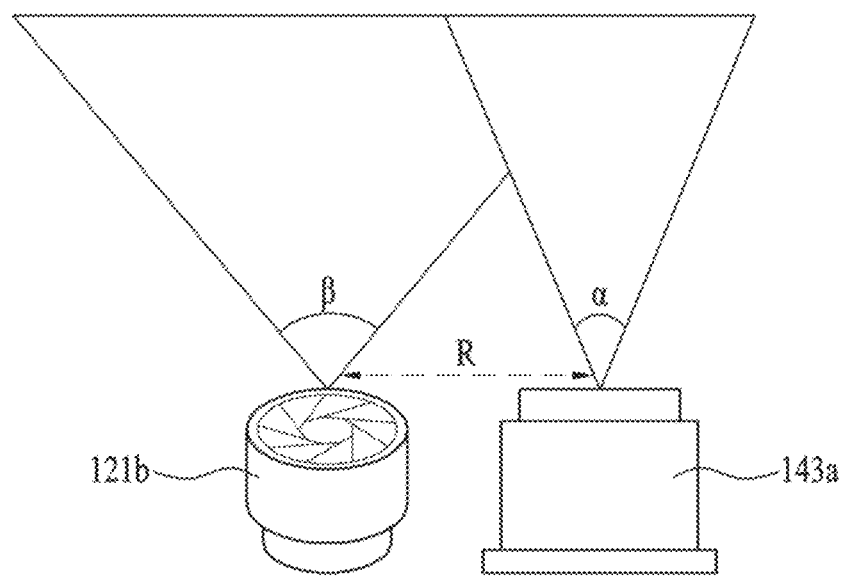
FIG. 7 is a schematic view illustrating an exemplary angle of view of the optimally disposed camera and an exemplary angle of measurement of the optimally disposed temperature sensor.
Figure 8:
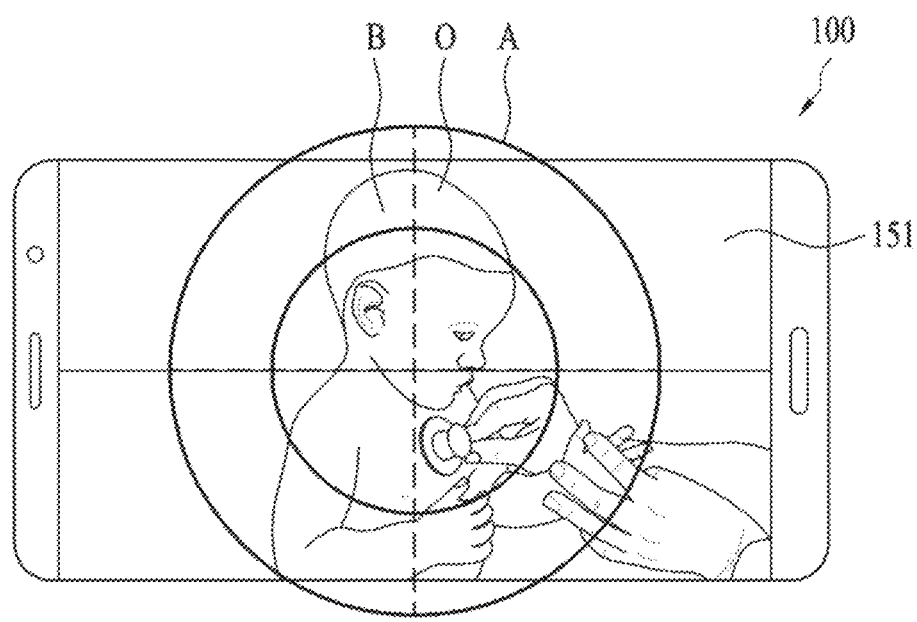
FIG. 8 is a plan view illustrating photograph and measurement ranges in accordance with the optimal disposition.

FIG. 4 is a schematic view illustrating a measurement range and angle of measurement of the temperature sensor depending on distance, and FIG. 5 is a plan view illustrating a photograph range in accordance with the camera's angle of view and a measurement range in accordance with the temperature sensor's angle of measurement. In addition, FIG. 6 is a rear view illustrating the camera and temperature sensor optimally disposed on the smart device, and FIG. 7 is a schematic view illustrating an exemplary angle of view of the optimally disposed camera and an exemplary angle of measurement of the optimally disposed temperature sensor. Moreover, FIG. 8 is a plan view illustrating photograph and measurement ranges in accordance with the optimal disposition. With reference to the drawings, the temperature sensor 143 will be described in detail in the following. Further, since FIGS. 2 and 3 shows the overall structure of the device 100, they are referred in the following description together with FIGS. 4 to 8 for convenience of description.

First, the temperature sensor 143 can be classified into a contact sensor and a non-contact sensor. The contact sensor is directly contacted with an object and then reaches thermal equilibrium with the object. Thereafter, the contact sensor can measure the temperature of the object. On the other hand, the non-contact sensor detects the thermal energy radiated by an object at a position away from the object and then measures the temperature of the object. In the case of the contact sensor, since the thermal energy of an object is transferred to the sensor, it may causes change in the object temperature. Thus, in the case of the contact sensor, it is difficult to accurately measure temperature, but the price of the contact sensor is relatively low due to the simple structure. On the contrary, since there is no direct thermal contact in the non-contact sensor, the non-contact sensor does not suffer from the above problem but its price is relatively higher than that of the contact sensor.

As shown in FIG. 3, the temperature sensor 143 may include a first sensor 143a disposed on the rear side of the smart device 100. Since the first sensor 143a is disposed opposite to the display unit 151, the user can check the temperature measured by the first sensor 143a on the display unit 151 in real time. Thus, the first sensor 143a may be advantageous of measuring not only the temperature of an object contacted with the smart device 100 but also the temperature of an object away from the smart device 100. For this reason, the first sensor 143a may be configured with a non-contact sensor capable of measuring temperature of a distant object. In addition, since the first sensor 143a may be used to measure the temperature of an object directly contacted with the smart device 100, it may also be implemented with a contact sensor if necessary. Meanwhile, as shown in FIG. 2, the temperature sensor 143 may include a second sensor 143b disposed on the front side of the smart device 100. The front side of the smart device 100 may be directly contacted with the user's face during a call. Thus, the second sensor 143b is advantageous of measuring the temperature of an object contacted with the smart device 100, particularly, the temperature of a body part, and therefore, the second sensor 143b may be implemented with a contact sensor. If necessary, the second sensor 143b may be implemented with a non-contact sensor.

As well known to the public, the camera 121 is configured to obtain the image of a distant object and may have a predetermined angle of view (AOV) or field of view (FOV) due to the structure of a sensor and lens and the structural features such as an opening for transferring the light to the sensor and lens. The angle of view means an angle for the camera 121 to capture an image. The angle of view is a unique value of the camera or lens thereof, and the photograph range or capture range A (cf. FIG. 5) of the camera 121 may be geometrically changed by the angle of view and distance. The photograph range A may be formed in the shape of a circular plane perpendicular to the central axis C of the camera 121, but it may have a different shape according to the characteristics of the camera or lens. Since the non-contact temperature sensor 143 has the similar structural features to the camera 121, it may have a predetermined angle of measurement (measurement angle) similar to the camera's angle of view. FIG. 4 shows the angle of measurement α and the characteristics of the temperature sensor 142. Although FIG. 4 shows the characteristics of the first sensor 143a on the assumption that it is configured with a non-contact sensor, the description of FIG. 4 can also be applied to the second sensor 143b even if the second sensor 143b is configured with a non-contact sensor. Referring to FIG. 4, the non-contact temperature sensor 143 may have the angle of measurement α for allowing the sensor 143 to measure temperature. As a distance from the temperature sensor 143 increases, the measurement range B also increases due to a geometric relationship based on the angle of measurement α. Similarly, as the distance decreases, the measurement range B decreases. In addition, similar to the camera 121, the measurement range of the temperature sensor 143 may be formed in the shape of a circular plane perpendicular to the central axis C thereof, or if necessary, it may have a different shape. For example, as shown in FIG. 4, if a distance from the temperature sensor 143 increase from the distance L1 to the distance L2 or L3, the diameter of the measurement range B increases from the diameter D1 to the diameter D2 or D3. In other words, the measurement range B of the non-contact temperature sensor 143 varies according to a distance from the sensor 143 to a certain object, that is, an object to be measured by the sensor 143. In addition, since the measurement range B is formed in the shape of a plane with a predetermined size, it may also be defined as an area in which temperature can be measured by the sensor 143. Further, considering that the temperature sensor 143 measures the temperature of an object by detecting the temperature of the corresponding object, the angle of measurement C and the measurement range B may be represented as the detection angle α and the detection range B, respectively.

As described above, by using the second camera 121*b* and first sensor 143*a* disposed on the rear side of the device 100, the user may check the measured temperature and image of the object on the display unit 151 in real time. That is, the user can easily measure and check the temperature of a certain object through the real-time measurement and checking. To achieve the above-described easy measurement, the camera 121 should be able to properly capture an image of the object. That is, when the object is placed in the field of view of the camera 121, the first sensor 143*a* should be able to measure the temperature of the object. In other words, the photograph range A of the second camera A needs to overlap with the measurement range B of the first temperature sensor 143*a*. In addition, since, in general, the first temperature sensor 143*a* measures the temperature of an object, which corresponds to a part of the captured image, the measurement range B does not need to be larger than the photograph range A. Thus, it is desirable that the measurement range B is set to be smaller than the photograph range A, that is, the measurement range B is included in the photograph range A. Further, since, in general, the user captures the image of an object by placing the object at the center of the image to be captured, it is desirable that the measurement range B and photograph range A have the same center point. To achieve the accurate and easy temperature measurement, the second camera 121*b* and first sensor 143*a* need to be implemented such that at least one of the above-described conditions is met. In other words, the second camera 121*b* and first sensor 143*a* may be implemented such that the photograph range A and measurement range B overlap with other, they have the same center point, or the measurement range B is included in the photograph range A. If the second camera 121*b* and first sensor 143*a* are improperly implemented, the measurement range B may be displaced from the object O in the captured image as shown in FIG. 5. In this case, the first sensor 143*a* cannot correctly measure temperature of the object O.

To satisfy the aforementioned conditions, the temperature sensor 143, that is, the first sensor 143*a* may be disposed adjacent to the camera 121, i.e., the second camera 121*b* as shown in FIG. 6. In detail, the first sensor 143*a* may be located in a predetermined radius, practically, in a radius of 8 mm. To meet the conditions, the angle of measurement α of the first sensor 143*a* and the angle of view β of the second camera 121*b* need to be properly adjusted as shown in FIG. 7. Practically, the angle of measurement α and angle of view β may be set to 45° and 80°, respectively. By disposing the first sensor 143*a* adjacent to the second camera 121*b* and adjusting the angle of measurement α and angle of view β, the measurement range B can overlap with the photograph range A, be included in the photograph range A, and have the same center point as that of the photograph range A as shown in FIG. 8. By doing so, the device 100 can capture the image of the object O using the second camera 121*b* and then measure the temperature of the corresponding object O using the first sensor 143*a* accurately and easily.

Meanwhile, the smart device 100 can perform the temperature measurement accurately and easily by optimizing the configuration of the temperature sensor 143. However, to provide more enhanced functionality, the temperature sensor 143 and relevant structures should be supported by the proper control under consideration of the structure and features of the device 100. In addition, the smart device 100 requires interaction with the user to provide the intended functions. Accordingly, the control optimization can guarantee to improve not only the user environment and user interface but also the intended functions. Further, the control optimization can remarkably improve the user experience for the smart device 100 such as ease of use, convenience of use, and the like. For these reasons, the method for controlling the smart device 100 shown in FIGS. 1 to 8 has been developed, and the method will be described with reference to the relevant drawings in addition to FIGS. 1 to 8. The description of FIGS. 1 to 8 and corresponding drawings are included and referred in the following unless specified otherwise.

In addition, the control methods, which will be explained in the following, can control the components described with reference to FIGS. 1 to 8, that is, operations of various elements and provide intended functions based on the operations. Thus, the operations and functions related to the control methods should be considered not only as the features of the control methods but also as the features of the corresponding relevant structural components. In particular, the control unit or processor 180 can be called various names such as a controller, a controlling device, and the like, and it can control all the components of the smart device 100 to perform predetermined operations. Therefore, the control unit 180 actually controls all the method and modes of the present invention, which will be described later, and thus, all steps in the following description can be considered as the characteristics of the control unit 180. For these reasons, it should be understood that the following steps and modes are performed and controlled by the control unit 180 unless specified otherwise.

Figure 9:
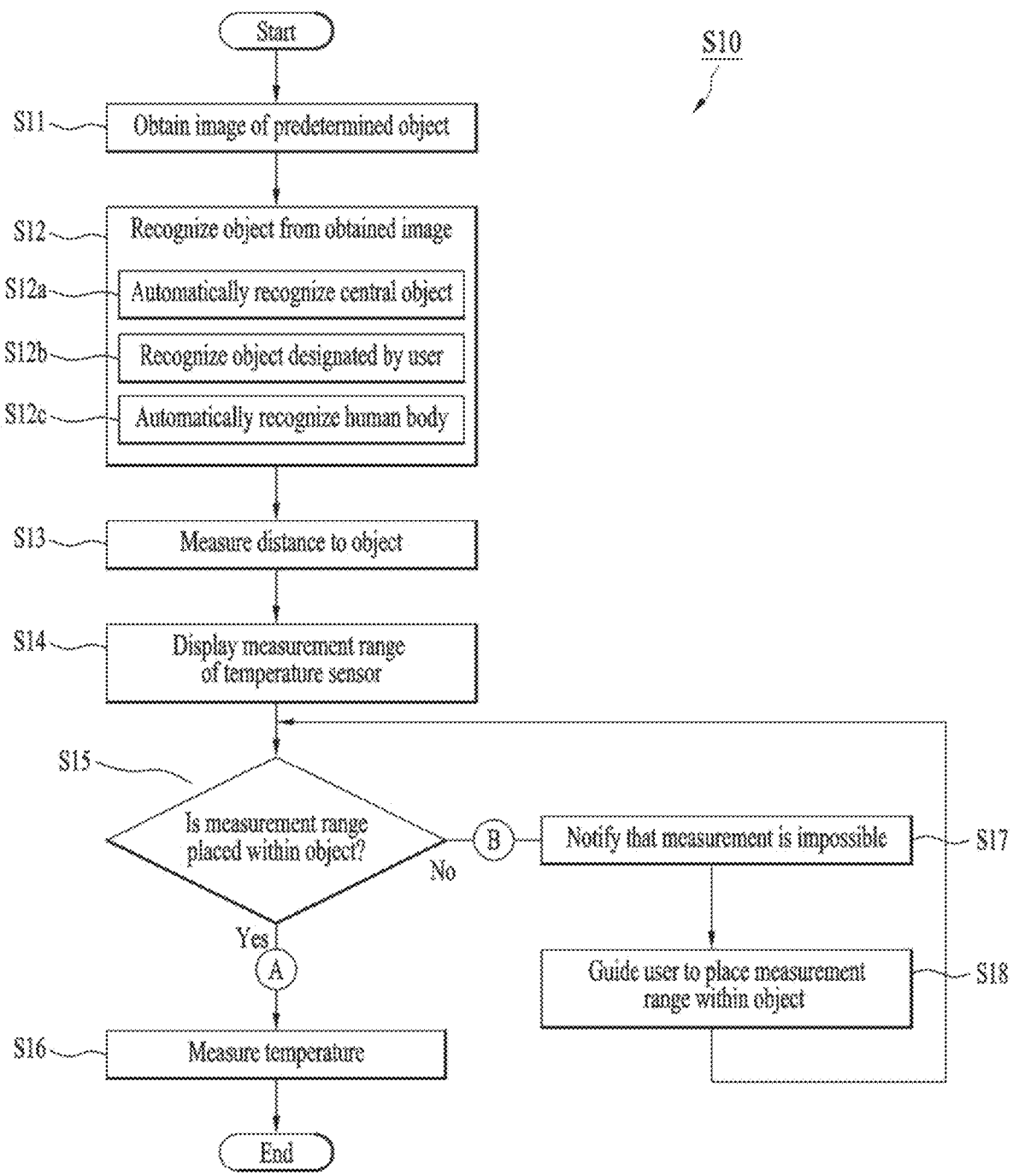
FIG. 9 is a flowchart illustrating the method for controlling the smart device according to the present invention.
Figure 10:
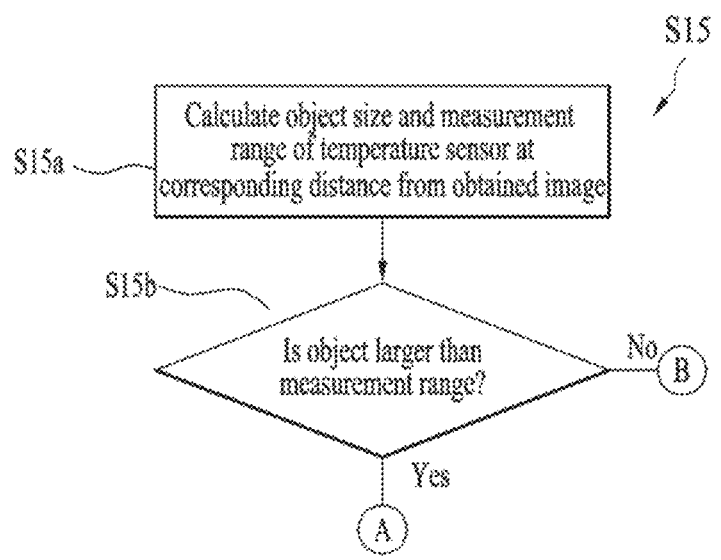
FIG. 10 is a flowchart illustrating in detail the detection step of FIG. 9.
Figure 11:
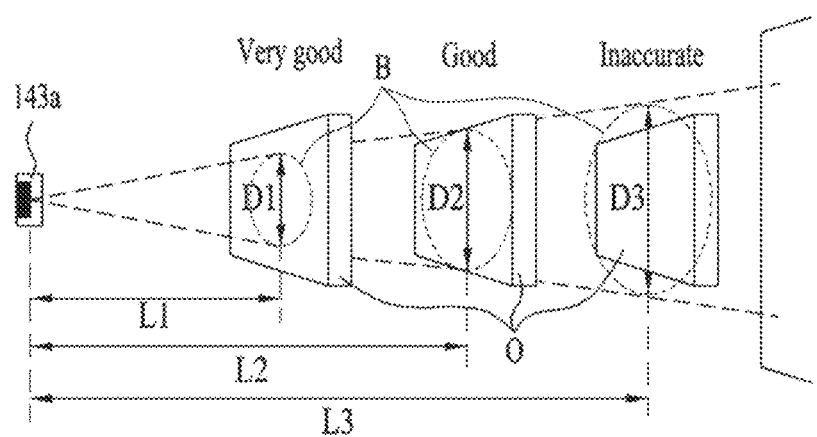
FIG. 11 is a schematic view illustrating a relationship between the measurement range, which depends on distance, and object size.
Figure 12:
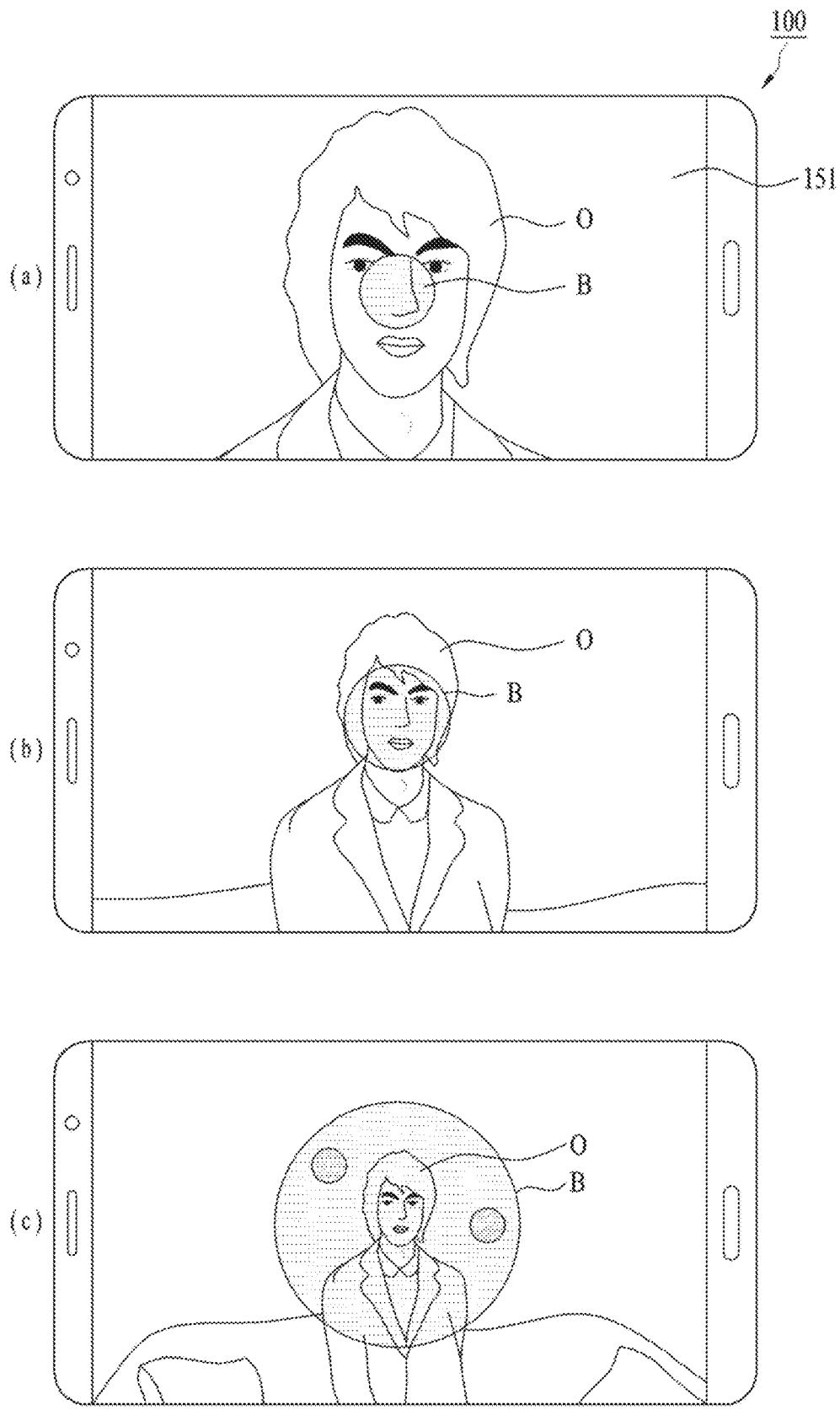
FIG. 12 illustrates an example of the relationship between the measurement range, which depends on distance, and object size.
Figure 13:
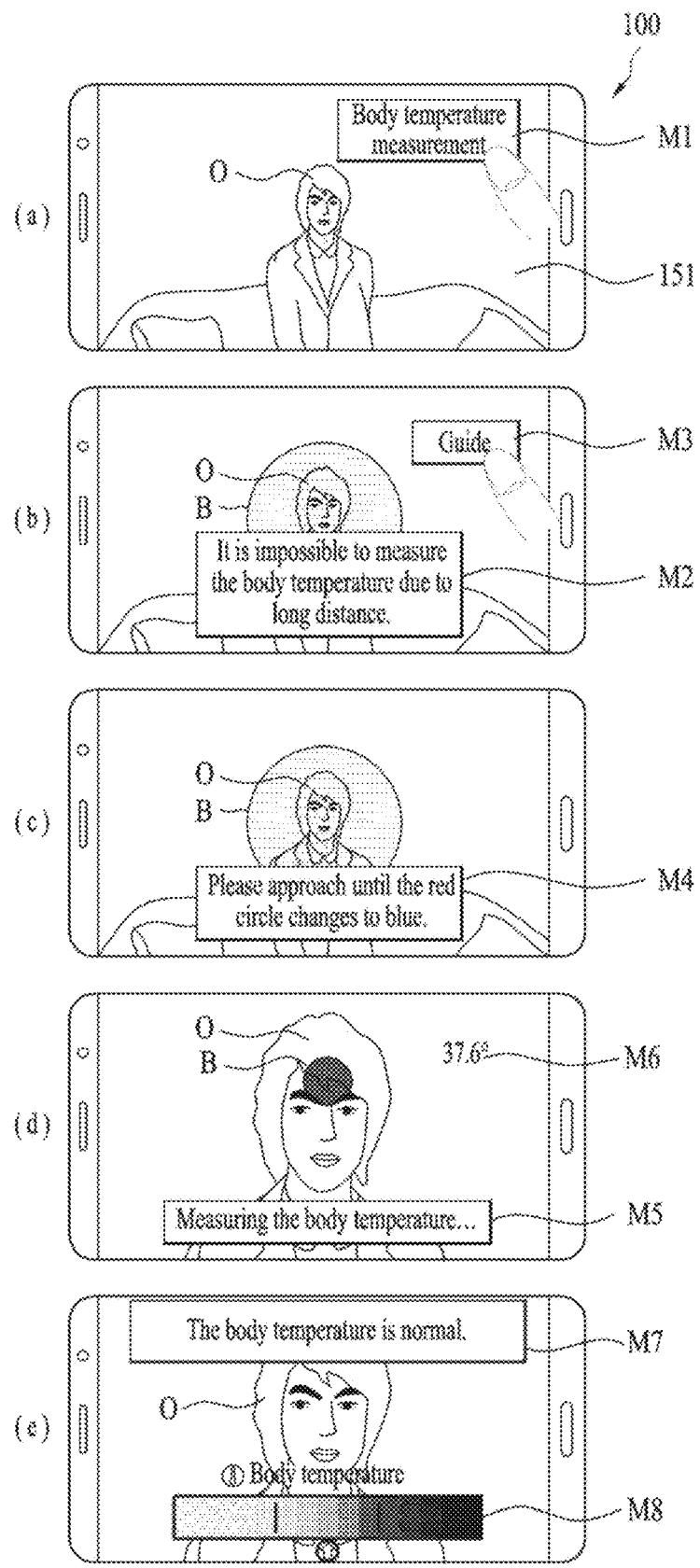
FIG. 13 illustrates an example according to the control method illustrated in FIG. 9.

FIG. 9 is a flowchart illustrating the method for controlling the smart device according to the present invention, and FIG. 10 is a flowchart illustrating in detail the detection step of FIG. 9. In addition, FIG. 11 is a schematic view illustrating a relationship between the measurement range, which depends on distance, and object size, and FIG. 12 illustrates an example of the relationship between the measurement range, which depends on distance, and object size. Moreover, FIG. 13 illustrates an example according to the control method illustrated in FIG. 9.

As described above, the smart device 100 can easily perform the real-time temperature measurement, which can be checked on the display unit 151, using the second camera 121*b* and first sensor 143*a* disposed on the rear side thereof. The control method S10 depicted in FIG. 9 may include steps for measuring the temperature of a certain object placed away from the smart device 100 through association with the image of the object According to the control method S10, the smart device 100 may acquire the image of a certain object for temperature measurement [S11]. In the acquisition step S11, the smart device 100, that is, the control unit 180 may obtain the image of the object O of which the temperature is measured by using the second camera 121*b* disposed on the rear side thereof. In detail, as illustrated in the example of FIG. 13(*a*), the smart device 100 may provide a menu or option for the temperature measurement through the display unit 151, and the menu or option M1 can be implemented as a selectable entity such as an icon, a button, etc. If the user selects the menu or option M1, the smart device 100 may receive a command related to the temperature measurement and then initiates the temperature measurement for the object O. When initiating the temperature measurement, the smart device 100 may obtain the image of the object O using the second camera 121b. In this case, the image may generally include not only the object O but also the background of the object O as shown in the drawing.

After the acquisition step S11, the smart device 100 may recognize the object O from the acquired image [S12]. As described above, the first sensor 143a corresponding to the non-contact temperature sensor has the measurement or detection range B that varies depending on the distance from the sensor 143a to the object O. When the variable detection range B is in the image of the object O, the smart device 100 can correctly perform the temperature measurement. Details will be described alter. Thus, the smart device should recognize the object O of which the temperature is to be measured in order to check whether the detection range B is in the image of the object O. In the recognition step S12, the smart device 100 first recognizes the appearance or outline of the object O from the image in order to recognize the object O. In detail, in the recognition step S12, the smart device 100 may automatically recognize an object located at the center of the image or the largest object [S12a]. As described above, when capturing the image of a certain object, a user tends to place the object of which the temperature is to be measured at the center of the image. In addition, for the same reason, when capturing the image of a desired object, a user tends to focus on the object so that the object has the largest size. Considering these tendencies, the smart device 100 may automatically recognize the object placed at the center or the largest object to achieve more convenient temperature measurement. As shown in FIG. 13(a), the user captures the image such that the object of which the temperature the user desires to measure, that is, the person is placed at the center of the image, and the smart device 100 may automatically recognize the object O. Further, in the recognition step S12, the smart device 100 may automatically recognize the human body from the obtained image [S12c]. Since the human body can be easily distinguished from other objects as shown in FIG. 13(a), the smart device 100 can easily recognize the human body through an image analysis technique. If the user desires to measure the human temperature, the smart device 100 can easily recognize the human body through the automatic recognition even though the human body is neither located at the center of the image nor enlarged. Thus, it is possible to provide more convenient temperature measurement. Furthermore, in the recognition step S12, the smart device 100 may recognize the object indicated by the user [S12b]. For example, as shown in FIG. 13(a), the user may touch the object O of which the temperature the user desires to measure, and the device 100 may recognize the touched object O through the image analysis technique. This manual recognition may be used when the user desires the smart device 100 to recognize the object O accurately.

In addition to the above-described outline detection, in the recognition step S12, the device 100 may detect the size of the object O of which the outline has been checked, for comparison with the measurement range B. The non-contact first sensor 143a measures the object temperature using the surface of the object, and the second camera 121b obtains a 2-dimensional image rather than a 3-dimensional image. That is, both the first sensor 143a and second camera 121b considers, as the photograph and measurement target, the 2-dimensional surface of the object O rather than the volume thereof. Thus, the size of the object O means the surface area surrounded by the recognized outline or size thereof. This definition can be applied to all object sizes unless specified otherwise. In addition, for the same reasons, each of the measurement range B and photograph range A means a 2-dimensional surface area, and this definition can also be applied to all ranges (A and B). Moreover, since the device 100 can know the size of the photograph range A of the second camera 121b, that is, the actual measurement thereof at the current location of the object O, which corresponds to a unique feature of the object O, in advance, the device 100 can calculate the actual size of the object O through the image analysis technique during the recognition step S12. On the other hand, the device 100 may detect a ratio of the object O to the size of the image displayed in the display unit 151 and then calculate a relative ratio of the object O to the image size based on the detected ratio rather than the absolute size.

The smart device can measure the distance from the device 100 to the object O [S13]. In the measurement step S13, the device 100 may measure the distance using the distance sensor 144. The distance sensor 144 may emit, for example, infrared light and then receive the infrared light reflected by the object O to measure the distance from the device 100 to the object O. If the actual size of the object O needs to be calculated in the recognition step S12 as described above, the actual measurement of the photograph range A at the current position of the object O is required, and the distance to the object O may be required to obtain the actual measurement. Thus, to calculate the actual size of the object O in the recognition step S12, the measurement step S13 may be performed before or together with the recognition step S12. Meanwhile, for example, if the relative size of the object O to the image is calculated in the recognition step S12, the photograph range A in accordance with the actual distance may not be needed. Thus, the measurement step S13 may be performed after the object O is recognized.

After measuring the distance to the object O, the smart device 100 may display the measurement range B of the first sensor 143a at the measured distance [S14]. In the display step S14, the smart device 100 may first calculate the measurement range B of the first sensor 143a at the measured distance, that is, the size thereof for comparison with the size of the object O of which the outline is checked, which is recognized in the recognition step S12. Since, similar to the photograph range A, the measurement range B is a preconfigured characteristic value of the first sensor 143a, the device 100 may know sizes (values) of the measurement range B of the first sensor B, which vary depending on distance, that is, actual measurements thereof in advance. For example, the memory 170 may store, as a table, not only the actual values of the photograph range A but those of the measurement range B varying depend on distance in advance. Thus, by referring to the table, the device 100 may immediately check the size of the measurement range B at the measured distance. On the other hand, even if the table does not exist, the device 100, specifically, the control unit 180 may calculate the photograph range A and measurement range B at the measured distance by using unique properties of the second camera 121b and first sensor 143a, for example, the angle of view and angle of measurement.

Meanwhile, in the acquisition step S11, the smart device 100 may adjust the size of the obtained image according to the screen size or resolution of the display unit 151 to display the image on the display unit 151. Thus, the smart device may adjust the calculated measurement range B based on not only the screen size or resolution of the display unit 151 but also the actual size of the image to be displayed and then display it together with the image. This adjustment may be performed by calculating the relative size of the measurement range B to the size of the displayed image. As a result of the display step S14, for example, the measurement range B may be displayed together with the image including the object O on the display unit 151 as shown in FIG. 13(b). Since the size of the measurement range B is adjusted in proportion to the image size, the device 100 and user may check, from the displayed measurement range B, in which part of the obtained image the temperature measurement will be performed. In FIG. 13(b), the measurement range B is displayed in the shape of a circle, which overlaps with the object O, and a shadow area in the circle is the area where the temperature measurement can be performed.

Thereafter, the smart device 100 may detect whether the measurement range B of the first sensor 143a is in the object O at the measured distance [S15].

As described with reference to FIG. 4, the measurement range B of the non-contact first sensor 143a may vary depending on distance due to the angle of measurement α. In addition, due to the varying measurement range B, the relative size of the measurement range B to the size of the object O may vary depending on distance as shown in FIG. 11, and this relative size may determine the accuracy of the temperature measurement. In detail, as shown in FIG. 11, if the object O is located at the distance L1, the measurement range B has the diameter D1. In this case, the size of the measurement range B may be smaller than that of the object O as shown in FIG. 12(a). In addition, if the object O is located at the distance L2, the measurement range B has the diameter D2. In this case, the size of the measurement range B may be almost equal to that of the object O of which the temperature is to be measured. In these two cases, that is, when the measurement range B is s almost equal to or smaller than the object O, the first sensor 143a measures only the temperature of the object O so that it can accurately perform the temperature measurement. However, if the object O is located at the distance L3 as shown in FIG. 11, the measurement range B has the diameter L3. In this case, the size of the measurement range B may be larger than that of the whole or part of the object O of which the temperature is to be measured as shown in FIG. 12(c). In this case, since the first sensor 143 measures not only the temperature of the object O but also that of the surrounding environment, the measured temperature may be inaccurate.

Therefore, if the object is located close to the first sensor 143a, the size of the measurement range B may be almost equal to or smaller than that of the object O, and thus the measurement can be performed accurately. On the contrary, if the object O is located away from the sensor 143a, the size of the measurement range B becomes larger than that of the object O so that the measurement may be inaccurate. Considering this mutual relationship, if the measurement range B has the size equal to or smaller than the object O, the measurement range B may be placed in the object O. Hence, the first sensor 143a can measure only the temperature of the object O, the accuracy of the measurement result can be improved. In detail, for the accurate measurement, the measurement range B needs to be placed within the outline of the recognized object O. That is, the measurement range B has to cover only the object O except other objects for the accurate measurement.

According to the control method S20 of the present invention, in the detection step S15, the device 100 can detect whether the measurement range B is placed within the object O before performing the measurement. In the detection step S15, the smart device 100 may first calculate the sizes of the object O and measurement range B at the measured distance from the obtained image [S15a]. As mentioned in the foregoing description, the object O and measurement range B, more particularly, the sizes thereof can be calculated in the recognition and display steps S12 and S14. However, before the detection step S15, the distance between the smart device 100 and object O may be changed, and thus the sizes of the object O and measurement range B may also be changed. Hence, for the accurate measurement, the calculation step S15a may be finally performed in the detection step S15. In addition, the calculation of the sizes of the object O and measurement range B may be performed only in either the recognition and display steps S12 and S14 or the calculation step S15a. Further, since details of the calculation step S15 are the same as those described in the recognition and display steps S12 and S14, it will be omitted.

Thereafter, the smart device 100 can compare the calculated size of the object O with the calculated measurement range B [S15b].

If the size of the object O is larger than the measurement range B, that is, if the measurement range B is smaller than the size of the object O, the smart device 100 may determine that the measurement range B is placed within the object O so that the temperature measurement can be accurately performed. Similarly, when the size of the object O is almost equal to that of the measurement range B, the temperature measurement can be accurately performed, that is, it may be determined that the measurement range B is placed within the object O. That is, as connected via "A" of FIGS. 9 and 10, the smart device 100 can measure the temperature of the object O using the first sensor 143a [S16]. For example, as shown in FIG. 13(d), if the measurement range B is smaller than the object O, the measurement range B can be placed within the object O. In this case, the device 100 may measure the temperature of the object O and then notify the user that the measurement is normally initiated. This notification M5 may be displayed as a text message on the display unit 151 as shown in FIG. 13(d), or it can be transferred to the user through vibration or sound. In addition, when completing the temperature measurement, the smart device 100 may inform the user of the measured temperature. For example, the measured temperature M6 may be displayed on the display unit 151 as shown in FIG. 13(d). Alternatively, the measured temperature M6 may be transferred to the user as a voice message. Further, if the smart device 100 measures human body temperature, the smart device 100 may provide a health state based on the measured temperature. For example, the smart device 100 may inform the user whether the measured temperature is normal in order to notify the health state. This may be provided as the text M7 or diagram M8, which is more convenient for the user to check the health state.

Meanwhile, if the size of the object O is smaller than the measurement range B, that is, if the measurement range B is larger than the size of the object O, the smart device 100 may determine that the measurement range B is not placed within the object O so that the measurement cannot be accurately performed. Thus, as connected via "B" of FIGS. 9 and 10, the smart device 100 may notify the user that it cannot measure the temperature of the object O [S17]. For example, as shown in FIG. 13(b), if the measurement range B is larger than the object O, the measurement range B cannot be placed within the object O. In this case, the device 100 may determine that it cannot accurately measure the temperature of the object O and then notify the user that the measurement cannot be normally initiated. This notification M2 may be displayed as a text message on the display unit 151 as shown in FIG. 13(b), or it can be transferred to the user through vibration or sound. In addition, to inform the user that the current measurement range B is not appropriate so that the temperature measurement cannot be initiated, the smart device 100 may change the color of the measurement range B to a specific color, for example, red.

Thereafter, the smart device may send, to the user, a guide for placing the measurement range B within the object O [S18]. Since that the measurement range B varies depending on distance, the smart device 100 can adjust the relative size of the measurement range B to the object O by adjusting the distance between the smart device 100, i.e., the first sensor 143a and object O. As described above, as the smart device is close to the object O, the measurement range B may be reduced so that it can be placed within the object O. Thus, in the guide step S18, the smart device 100 may inform the user that the user needs to reduce the distance from the smart device 100 to object O. In detail, in the guide step S18, the smart device 100 may guide the user to approach the object while holding the smart device 100 or bring the object O close to the user. This notification M4 can be displayed as a text message on the display unit 151 or directly transferred to the user as a voice message. If the user adjusts the distance according to the guide so that the measurement range B is smaller than the object O, the smart device 100 can determine that the measurement range B is placed within the object for the accurate measurement [S15 and S15b]. For example, to inform that the measurement range B is appropriate now, the smart device 100 may change the color of the measurement range B from the specific color, for example, red to another color, for example, blue. Thereafter, the smart device 100 may sequentially perform not only the measurement step S16 but other steps to acutely measure the temperature and notify the measured one as described above.

As described above with reference to FIGS. 2 and 3, the smart device 100 may include the second sensor 143b disposed on the front side, in addition to the first sensor 143a disposed on the rear side. The front side of the smart device 100 may be contacted with the user's face during a call. Thus, if the second sensor 143b is configured with the contact sensor, the smart device 100 may easily measure the temperature of an object contacted with the device 100, particularly, the temperature of the human body. For this reason, the control method S20 of FIG. 14 may include steps for measuring the temperature of an object contacted with the smart device 100 based on the contact, which occurs during its use.

Figure 14:
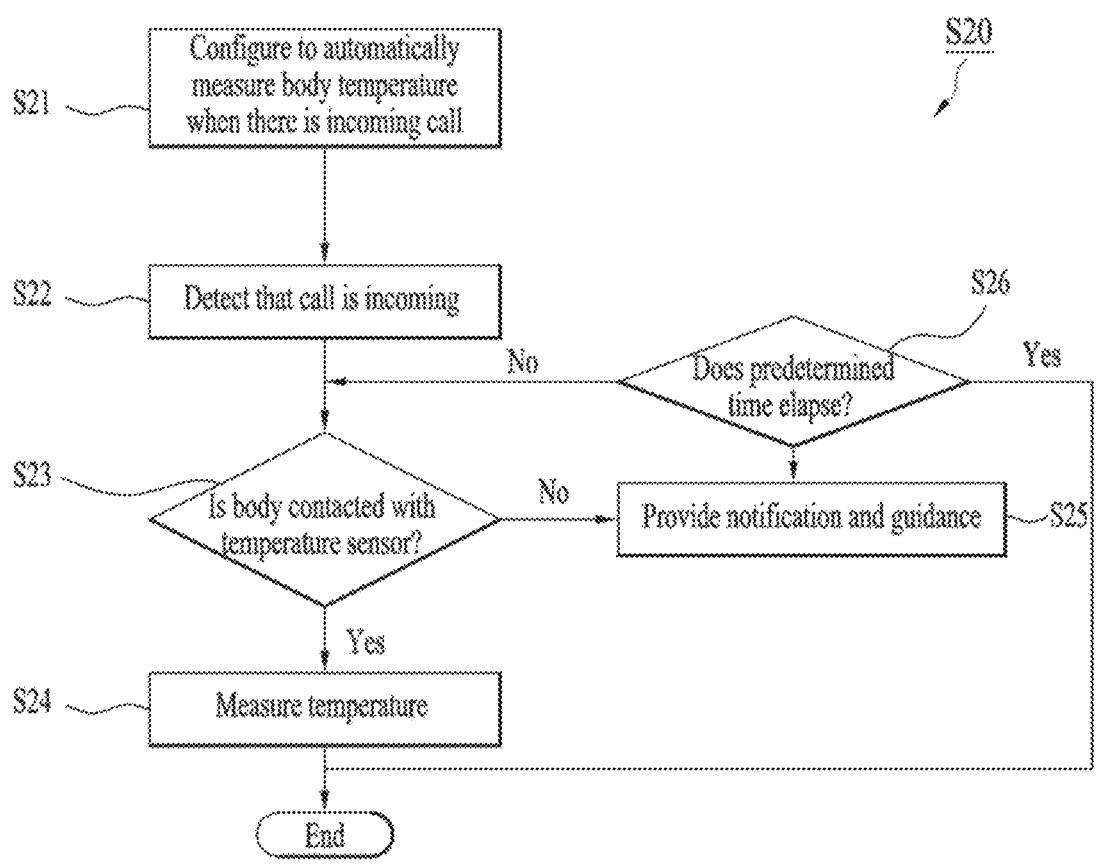
FIG. 14 is a flowchart illustrating an additional method for controlling the smart device according to the present invention.
Figure 15:
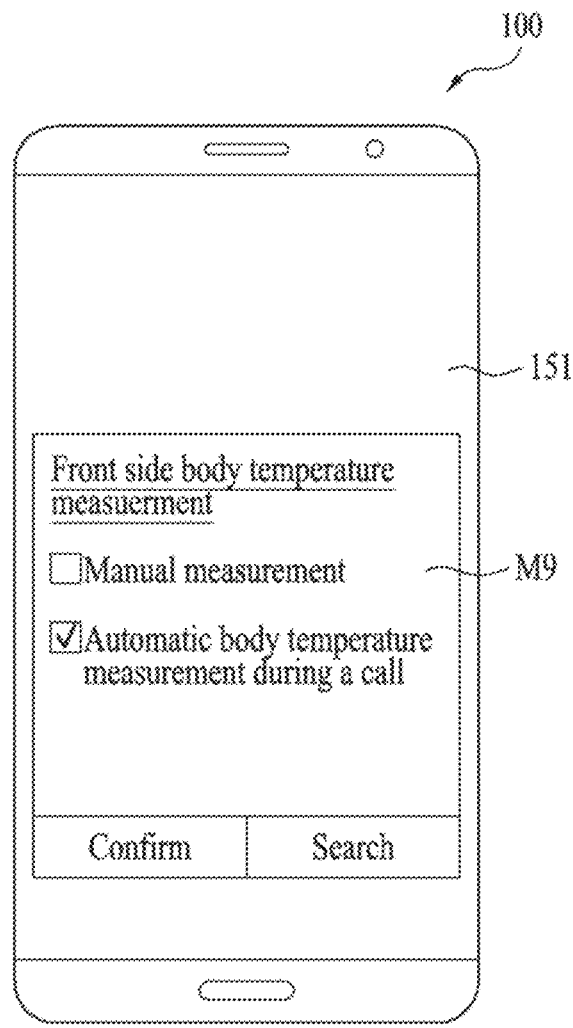
FIG. 15 is a plan view illustrating an example of the configuration step of FIG. 14.
Figure 16:
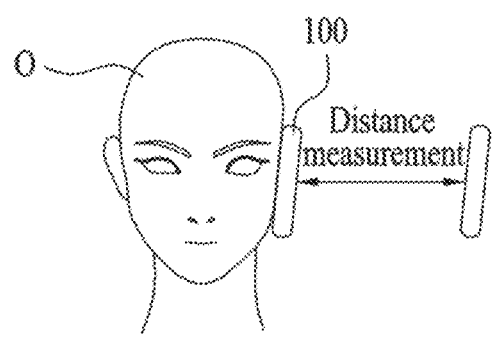
FIG. 16 is a plan view illustrating an example of the detection step of FIG. 14.

FIG. 14 is a flowchart illustrating an additional method for controlling the smart device according to the present invention, FIG. 15 is a plan view illustrating an example of the configuration step of FIG. 14, and FIG. 16 is a plan view illustrating an example of the detection step of FIG. 14. Hereinafter, details of the control method S20 will be described in detail with reference to these drawings. Since the control method S20 is to measure the user's temperature as described above, the user will be hereinafter described as the object O of which the temperature is to be measured.

Referring to FIG. 14, according to the control method S20, the smart device 100 may be configured to measure the user's temperature during a call [S21]. In general, the user O uses the phone function of the smart device 100 most frequently. In addition, while making a call, the user may attach the device 100 to his or her face to use the receiver 152a and microphone 122 as shown in FIG. 16. Thus, the device 100 may easily measure the user's temperature from the attached part. For this reason, the smart device 100 can easily and accurately measure the temperature during a call, compared to other cases. However, considering that calls frequently occurs, it may be inconvenient to measure the body temperature whenever there is a call. Thus, the device 100 needs to selectively perform the temperature measurement during a call, and to this end, the configuration step S21 may be included. In detail, as shown in the example of FIG. 15, the smart device 100 may provide a menu M9 for measuring the body temperature on the display unit 151. This menu M9 may include an option for enabling the body temperature measurement during a call. If this option is selected, the body temperature shall be automatically measured during the call, and the user can easily check the temperature without any additional manipulation. Meanwhile, the menu M9 may include an option for enabling to manual body temperature measurement. When this option is selected, if the user contacts with the smart device 100, for example, if the user make a call, the smart device 100 may provide the user with a notification informing that the temperature measurement is available. This notification may be provided as vibration or sound. Thus, while contacting with the smart device 100, for example, making a call through the smart device 100, the user may manually instruct the smart device 100 to measure the body temperature. To this end, the user may use the user input unit 123 installed in the smart device 100, for example, push physical buttons provided in the smart device 100.

If the automatic measurement is set in the configuration step S21, the smart device 100 can detect whether there is an incoming call [S22]. In the detection step S22, the smart device 100 may analyze various signals delivered to the device 100 from an external network and then detects whether there is an incoming call, from the analysis. For example, a call may be received through a wireless Internet signal such as VoIP as well as a general wireless communication signal. Upon receiving these signals, the device 100 may determine that there is an incoming call.

When a call is received, the smart device 100 may detect whether any part of the user O contacts with the second temperature sensor 143b [S23]. In general, the user tends to stick the user's ear to the receiver 152a to listen voice during a call as shown in FIG. 16. That is, in most cases, the receiver 152a and surrounding area thereof may be directly contacted with the user O during a call. In addition, the ear is an organ capable of reflecting change in the body temperature very well. Thus, the second sensor 143b may be disposed adjacent to the receiver 152a to be contacted with the user O, i.e., the user's ear as shown in FIG. 2. In addition, the smart device 100 may measure the distance from the user O to the device 100 using the proximity sensor disposed on the front side. Thus, if the measured distance is close to or equal to zero, that is, if the measured value has no valid (actual) value, the smart device 100 may determine that the user O contacts with the deice 100, i.e., the second sensor 143b. On the other hand, if the measured value has a valid (actual) value, the smart device may determine that the user O does not contact with the second sensor 143b.

If it is determined that the body of the user O contacts with the second sensor 143b, the smart device 100 can measure the temperature of the user O using the second sensor 143b [S24]. After completing the temperature measurement, the smart device 100 may inform the user of the measured temperature. For example, the measured temperature may be displayed on the display unit 151 or transferred to the user as voice. Further, the smart device 100 may inform the user whether the measured body temperature is normal or not in order to notify the health state. This notification may be provided as a text message or diagram, which is more convenient for the user to check the health state.

Meanwhile, if it is determined that the body of the user O does not contact with the second sensor 143b, the smart device 100 may notify the user that it cannot measure the temperature of the user O [S25]. For example, this notification may be displayed as text on the display unit 151 as shown in FIG. 13(b) or transferred to the user as vibration or sound.

Thereafter, the smart device 100 may guide the user to contact the body of the user O with the second sensor 143b [S25]. For example, in the guide step S25, the smart device 100 may guide the user to stick the user's face, and more particularly, the user's ear to the smart device 100 for the contact between the user's body and second sensor 143b. This notification may be directly transferred to the user as sound or vibration. If the user sticks the user's ear to the smart device 100 according to the guide so that the distance between the user O and device 100 is close to or equal to zero, the smart device 100 may determine that the body of the user O contacts with the second sensor 143b for the accurate measurement. Thereafter, the smart device 100 may sequentially perform not only the measurement step S24 but other steps to acutely measure the temperature and notify the measured one as described above. Meanwhile, if the body of the user O does not contact with the second sensor 143b until a predetermined time expires, the measurement of the user's body temperature may be automatically ended [S26].

Figure 17:
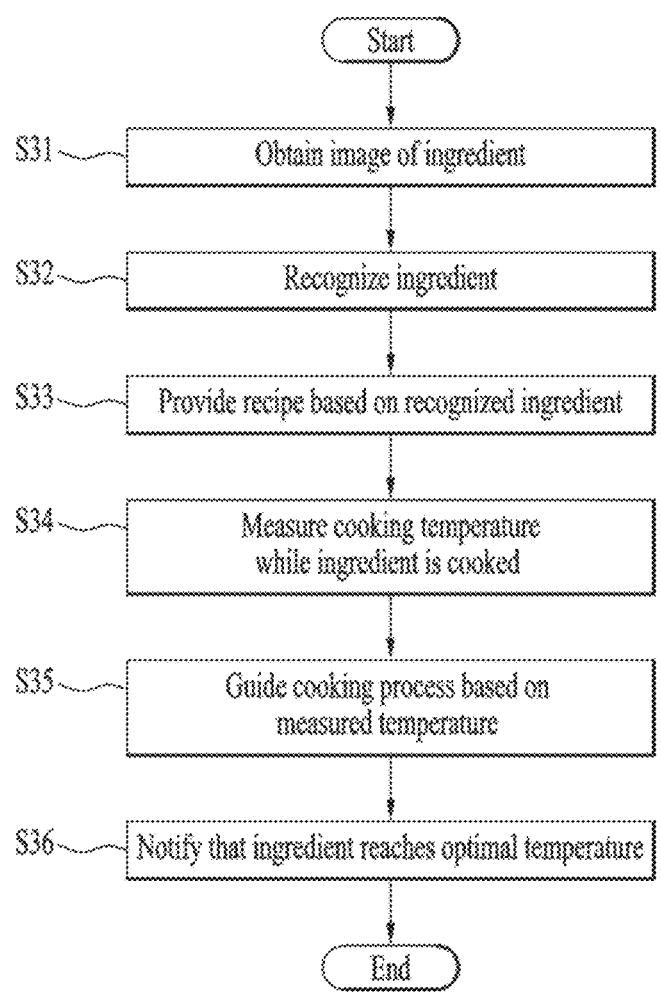
FIG. 17 is a flowchart illustrating another additional method for controlling the smart device according to the present invention.

Meanwhile, since the temperature sensor 143 (143a and 143b) may measure the temperature of another object as well as the body temperature, the smart device 100 can provide various functions to the user based on the measured temperatures. Among various functions, a method for utilizing the temperature sensor 143 in cooking will be described in the following. FIG. 17 is a flowchart illustrating another additional method for controlling the smart device according to the present invention, and FIG. 18 is a plan view illustrating an example of the control method illustrated in FIG. 17.

In general, the user first decides the food that he or she wants to cook and then prepares ingredients. On the other hand, the user may decide the food that he or she will cook based on the prepared ingredients. In both cases, a recipe may be helpful for cooking. In this case, it may be important which ingredients the user has. Thus, according to the control method S30 of FIG. 17, the smart device 100 may first obtain an image of ingredients and then recognize the ingredients from the obtained image [S31 and S32]. In detail, as shown in FIG. 18(a), when the user has shrimps as an ingredient, the smart device 100 captures the image of the ingredient using the second camera 121b and then recognizes the ingredient by analyzing the captured image.

When the ingredient is recognized, the smart device 100 may provide recipes for the recognized ingredient [S33]. As shown in FIG. 18(a), the smart device 100 makes a list of recipes for the recognized ingredient through searching on the Internet or data previously stored therein and then provides the user with the menu M10 including the list. If the user selects one from among the recipes, the smart device 100 may provide the user with details of the selected recipe as shown in FIG. 18(b). Meanwhile, when the user decides the food in advance, the user may obtain a better recipe related to the food from the provided option M10. In addition, even when the user does not decide the food, the user may use the provided option M10 to decide the food that the user desires to have and relevant recipe Thereafter, the user may cook the food according to the selected recipe. In general, recipes accompany with various processes associated with ingredients, and it is important to maintain accurate temperature in the processes. Thus, the smart device 100 may measure the cooking temperature while the user uses the ingredient to cook the food [S34]. For example, when the user decides to make fried shrimp, the smart device 100 may measure the temperature of the oil using the first sensor 143a remotely and then inform the user of the oil temperature as shown in FIG. 18(c). Although not shown in the drawing, if necessary, the user may stick the second sensor 143b to an ingredient to measure the temperature of the ingredient. In addition, the smart device 100 may provide an additional function related to the temperature measurement to the user. For example, the smart device 100 may expect a time required for the oil to reach the optimal temperature according to the provided recipe and then inform the user of the expected time. In addition, the smart device 100 may provide the user with a timer in order to allow the user to check the cooking time.

Moreover, the smart device 100 may guide a process for cooking the ingredient based on the measured temperature in advance [S35]. Since the smart device 100 has information on the selected recipe as described above, the smart device 100 may inform the user in advance of the processes that should be performed at the measured temperature based on the selected recipe. For example, as shown in FIG. 18(d), the smart device 100 may inform the user in advance that the user should put in the shrimps into the oil at the optimal temperature of 180° C. Thus, the user can prepare the shrimps in advance. Thereafter, if the oil reaches the optimal temperature, the smart device 100 may inform the user of the fact that the oil reaches the optimal temperature [S36]. For example, as shown in FIG. 18(d), the smart device 100 may inform the user that the oil is heated to the optimal temperature of 180° C. and at the same time, guide the process that should be performed at the optimal temperature again. In other words, the smart device 100 may inform that the user should put the shrimps into the oil, similar to the guide step S35.

The above-described embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for controlling a smart device configured to measure a temperature of an object at a position away from the object and comprising a temperature sensor with a measurement range varying according to a distance from the smart device to the object, the method performed by the smart device and comprising:
    measuring the distance from the smart device to the object to measure the temperature of the object;
    determining whether the measurement range of the temperature sensor is within the object at the measured distance by:
        calculating a size of the object and the measurement range of the temperature sensor at the measured distance by using an image of the object obtained by the smart device; and comparing the calculated size of the object to the calculated measurement range of the temperature sensor;
notifying a user that the temperature of the object cannot be measured when the measurement range of the temperature sensor is not within the object at the measured distance; and
guiding the user to place the measurement range within the object.

2. The method of claim 1, wherein the measurement range of the temperature sensor corresponds to an area in which the temperature can be measured by the temperature sensor.

3. The method of claim 1, further comprising:
obtaining the image of the object through a camera of the smart device prior to the measuring the distance; and
recognizing the object from the image obtained through the camera.

4. The method of claim 3, wherein the recognizing the object comprises:
either automatically recognizing an object located at a center of the obtained image or a largest object as the object; or
recognizing an object designated by the user as the object.

5. The method of claim 3, wherein the recognizing the object comprises automatically recognizing a human body from the obtained image as the object.

6. The method of claim 3, wherein the measuring the distance comprises measuring the distance between the recognized object and the smart device.

7. The method of claim 1, further comprising displaying the measurement range of the temperature sensor at the measured distance prior to the notifying the user.

8. The method of claim 1, wherein the determining whether the measurement range of the temperature sensor is within the object at the measured distance comprises:
determining that the measurement range of the temperature sensor is within the object when the size of the object is larger than the measurement range of the temperature sensor; and
determining that the measurement range of the temperature sensor is not within the object when the size of the object is smaller than the measurement range of the temperature sensor.

9. The method of claim 1, wherein the guiding the user comprises informing the user to reduce the distance between the smart device and the object.

10. The method of claim 1, further comprising:
measuring the temperature of the object using the temperature sensor when the measurement range of the temperature sensor is within the object at the measured distance; and
notifying the user of the measured temperature.

11. The method of claim 1, wherein:
the smart device further comprises a camera configured to receive the image of the object; and
the temperature sensor and the camera are configured such that an angle of measurement of the temperature sensor and an angle of view of the camera overlap with each other.

12. The method of claim 11, wherein:
the angle of view of the camera is 80°;
the angle of measurement of the temperature sensor is 45°; and
the temperature sensor is located in a radius of 8 mm around the camera.

13. A method for controlling a smart device comprising a temperature sensor configured to measure a temperature of an object by contacting the object, the method performed by the smart device and comprising:
detecting an incoming call to the smart device;
detecting whether a body of a user contacts the temperature sensor by measuring a distance between the smart device and the body of the user in response to the incoming call received; and
measuring a body temperature of the user in response to contact between the body of the user and the temperature sensor.

14. The method of claim 13, wherein the temperature sensor is disposed adjacent to an audio output unit of the smart device configured to output sound.

15. The method of claim 13, further comprising notifying the user that the temperature of the object cannot be measured when the user's body is not in contact with the temperature sensor.

16. The method of claim 15, further comprising guiding the user to contact the user's body with the temperature sensor when the user's body is not in contact with the temperature sensor.

17. The method of claim 13, further comprising configuring the smart device to automatically measure the body temperature of the user during a call prior to the detecting the incoming call such that the body temperature is measured automatically when the body of the user contacts the temperature sensor in response to the detected incoming call.

18. The method of claim 13, further comprising terminating the measurement of the user's body temperature when the user's body is no longer in contact with the temperature sensor for a predetermined time.

19. The method of claim 1, wherein the smart device further comprises:
a camera; and
a display.

20. The method of claim 19, wherein the method further comprises:
receiving the image of the object through the camera; and
displaying the image of the object on the display.

* * * * *